US012602515B2

(12) United States Patent
Farimani et al.

(10) Patent No.: US 12,602,515 B2
(45) Date of Patent: *Apr. 14, 2026

(54) INSTRUMENTATION USING ACCESS TIME VALUE

(71) Applicant: RapidFort, Inc., Sunnyvale, CA (US)

(72) Inventors: Mehran Farimani, San Francisco, CA (US); Rajeev Thakur, Sunnyvale, CA (US); Chien-Hung Chen, Tainan City (TW)

(73) Assignee: RapidFort, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/365,372

(22) Filed: Oct. 22, 2025

(65) Prior Publication Data

US 2026/0044631 A1      Feb. 12, 2026

Related U.S. Application Data

(63) Continuation of application No. PCT/US2024/019684, filed on Mar. 13, 2024, which is a continuation of application No. 18/140,259, filed on Apr. 27, 2023.

(51) Int. Cl.
*G06F 21/62* (2013.01)
*G06F 11/362* (2025.01)
*G06F 16/10* (2019.01)

(52) U.S. Cl.
CPC ...... *G06F 21/6281* (2013.01); *G06F 11/3644* (2013.01); *G06F 16/10* (2019.01); *G06F 2221/2141* (2013.01)

(58) Field of Classification Search
CPC .................................................. G06F 21/6281
See application file for complete search history.

(56) References Cited

U.S. PATENT DOCUMENTS

| | | | |
|---|---|---|---|
| 6,285,995 | B1 | 9/2001 | Abdel-Mottaleb et al. |
| 9,230,131 | B2 | 1/2016 | Price et al. |
| 10,042,947 | B2 | 8/2018 | Lin |
| 10,073,969 | B1 | 9/2018 | Faibish et al. |
| 11,360,871 | B1 | 6/2022 | Farimani et al. |
| 2005/0278278 | A1 | 12/2005 | Petev et al. |

(Continued)

FOREIGN PATENT DOCUMENTS

| | | |
|---|---|---|
| CN | 112699082 A | 4/2021 |
| CN | 114697440 A | 7/2022 |

(Continued)

OTHER PUBLICATIONS

Capabilities(7)—Linux Manual Page, https://man7.org/linux/man-pages/man7/capabilities.7.html, viewed Dec. 2, 2022, 24 pages.

(Continued)

*Primary Examiner* — Brittany N Allen
(74) *Attorney, Agent, or Firm* — Young Basile Hanlon & MacFarlane, P.C.

(57) ABSTRACT

A computer sets an access time for a set of files to an initial value. Upon accessing a file by a set of executables, the computer sets the access time of the file to a new value. The computer identifies, from the set of files, a subset of files accessed by the set of executables based on the access time of files in the subset being different from the initial value. The computer provides an output representing the subset of files.

30 Claims, 8 Drawing Sheets

*800*

SET AN ATIME FOR A SET OF FILES TO AN INITIAL VALUE ~ *802*

UPON ACCESSING A FILE BY A SET OF EXECUTABLES, SET THE ATIME OF THE FILE TO A NEW VALUE ~ *804*

IDENTIFY A SUBSET OF FILES ACCESSED BY THE SET OF EXECUTABLES BASED ON THE ATIME OF FILES IN THE SUBSET BEING DIFFERENT FROM THE INITIAL VALUE ~ *806*

(56) References Cited

U.S. PATENT DOCUMENTS

| | | | |
|---|---|---|---|
| 2006/0101413 | A1 | 5/2006 | Kinno et al. |
| 2011/0231458 | A1 | 9/2011 | Sutoh et al. |
| 2014/0188808 | A1 | 7/2014 | Wolf et al. |
| 2014/0380414 | A1 | 12/2014 | Saidi et al. |
| 2016/0019224 | A1 | 1/2016 | Ahn et al. |
| 2016/0124990 | A1 | 5/2016 | Suggs et al. |
| 2016/0283198 | A1 | 9/2016 | Walker |
| 2017/0031939 | A1 | 2/2017 | Wenzel |
| 2018/0032423 | A1 | 2/2018 | Bull et al. |
| 2019/0087596 | A1 | 3/2019 | Lin |
| 2019/0095441 | A1 | 3/2019 | Scrivano |
| 2020/0125731 | A1 | 4/2020 | Benameur et al. |
| 2021/0026949 | A1 | 1/2021 | Korotaev |
| 2021/0042638 | A1 | 2/2021 | Novotny |
| 2021/0075794 | A1 | 3/2021 | Gazit et al. |
| 2024/0086558 | A1 | 3/2024 | Jadhav et al. |
| 2024/0396974 | A1 | 11/2024 | Tiagi |

FOREIGN PATENT DOCUMENTS

| | | |
|---|---|---|
| CN | 115567634 A | 1/2023 |
| CN | 116016292 A | 4/2023 |
| CN | 116431578 A | 7/2023 |
| WO | 2024226189 A1 | 10/2024 |

OTHER PUBLICATIONS

Containers vs VMs, https://www.redhat.com/en/topics/containers/containers-vs-vms, Published Jan. 15, 2020, viewed Feb. 21, 2023, 9 pages.

Add the SYS_PTRACE Linux Kernel Capability, https://docs.rapidfort/com/how-to/add-sys-ptrace, viewed Dec. 2, 2022, 6 pages.

Podman vs Docker: What are the differences?, https://www.imaginarycloud.com/blog/podman-vs-docker/, viewed Dec. 1, 2022, 8 pages.

Office Action cited in U.S. Appl. No. 17/103,043, dated Jan. 20, 2022, 9 pages.

International Search Report and Written Opinion issued on Jul. 15, 2024 for PCT Patent Application Serial No. PCT/US2024/019684, 10 pages.

Kubernetes. "Dynamic admission control." Retrieved from https://kubernetes.io/docs/reference/access-authn-authz/extensible-admission-controllers/ on Jul. 27, 2023, 23 pp.

Wikipedia contributors. "Berkeley packet filter." Wikipedia, The Free Encyclopedia. Retrieved from https://en.wikipedia.org/w/index.php?title=Berkeley_Packet_Filter&oldid=1131815251 on Jul. 22, 2023, 5 pp.

Kubernetes, "Namespaces," Retrieved from https://kubernetes.io/docs/concepts/overview/working-with-objects/namespaces/ on Jul. 22, 2023, 3 pp.

GitHub. "Bolinfest / opensnoop—native." Retrieved from https://github.com/bolinfest/opensnoop-native on Jul. 18, 2023, 3 pp.

Gregg, Brendan. "Opensnoop for Linux." Brendan Gregg's Blog. Jul. 25, 2014. Retrieved from https://www.brendangregg.com/blog/2014-07-25/opensnoop-for-linux.html on Jul. 18, 2023, 4 pp.

Kubernetes, "Deployments," Retrieved from https://kubernetes.io/docs/concepts/workloads/controllers/deployment/ on Jul. 15, 2023, 25 pp.

"What is a Kubernetes manifest?" Stack Overflow. Retrieved from https://stackoverflow.com/questions/55130795/what-is-a-kubernetes-manifest on Jul. 15, 2023, 2 pp.

Wikipedia contributors. "Promiscuous mode." Wikipedia, The Free Encyclopedia. Retrieved from https://en.wikipedia.org/w/index.php?title=Promiscuous_mode&oldid=1159901543 on Jul. 14, 2023, 2 pp.

Wikipedia contributors. "Transmission control protocol." Wikipedia, The Free Encyclopedia. Retrieved from https://en.wikipedia.org/w/index.php?title=Transmission_Control_Protocol&oldid=1165370425 on Jul. 14, 2023, 22 pp.

"Berkeley packet filters." IBM Documentation. Retrieved from https://www.ibm.com/docs/en/qsip/7.4?topic=queries-berkeley-packet-filters on Jul. 14, 2023, 7 pp.

Wikipedia contributors. "Webhook." Wikipedia, The Free Encyclopedia. Retrieved from https://en.wikipedia.org/w/index.php?title=Webhook&oldid=1156370320 on Jul. 14, 2023, 2 pp.

International Search Report and Written Opinion issued on Nov. 25, 2024 for PCT Patent Application Serial No. PCT/US2024/042478, 8 pages.

International Search Report and Written Opinion issued on Nov. 26, 2024 for PCT Patent Application Serial No. PCT/US2024/042477, 8 pages.

Office Action issued for U.S. Appl. No. 18/806,152, dated Dec. 4, 2024, 28 pages.

Google Patents/Scholar search—text refined (Year: 2024).

Office Action issued for U.S. Appl. No. 18/806,141, dated Dec. 10, 2024, 16 pages.

Office Action issued for U.S. Appl. No. 18/140,259, dated Mar. 24, 2025, 49 pp.

Final Office Action issued for U.S. Appl. No. 18/806,141, dated Mar. 31, 2025, 25 pp.

Google Scholar/Patents search—text refined (Year: 2025).

Final Office Action received for U.S. Appl. No. 18/140,259, dated Aug. 18, 2025, 24 pp.

Office Action issued for U.S. Appl. No. 18/140,259, dated Dec. 1, 2025, 14 pp.

*FIG. 4*

Figure 6:
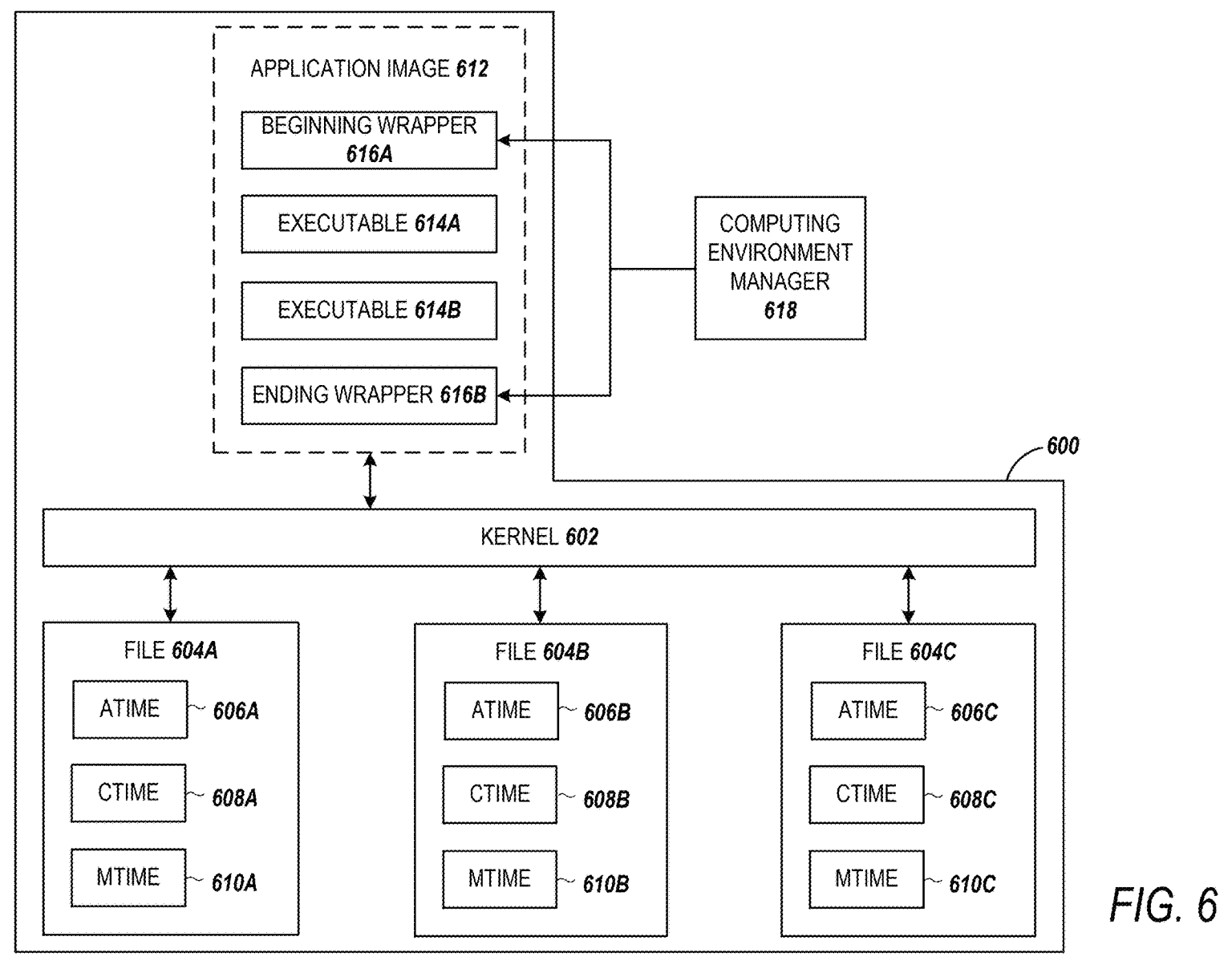

COMPUTING ENVIRONMENT MANAGER *618*

APPLICATION IMAGE *612*

BEGINNING WRAPPER *616A*

EXECUTABLE *614A*

EXECUTABLE *614B*

ENDING WRAPPER *616B*

KERNEL *602*

FILE *604A*

ATIME — *606A*

CTIME — *608A*

MTIME — *610A*

FILE *604B*

ATIME — *606B*

CTIME — *608B*

MTIME — *610B*

FILE *604C*

ATIME — *606C*

CTIME — *608C*

MTIME — *610C*

SET AN ATIME FOR A SET OF FILES TO AN INITIAL VALUE ~ *802*

UPON ACCESSING A FILE BY A SET OF EXECUTABLES, SET THE ATIME OF THE FILE TO A NEW VALUE ~ *804*

IDENTIFY A SUBSET OF FILES ACCESSED BY THE SET OF EXECUTABLES BASED ON THE ATIME OF FILES IN THE SUBSET BEING DIFFERENT FROM THE INITIAL VALUE ~ *806*

INSTRUMENTATION USING ACCESS TIME VALUE

CROSS REFERENCE TO RELATED APPLICATIONS

This application is a continuation of International Application No. PCT/US2024/019684, titled "Instrumentation Using Access Time Value," filed on Mar. 13, 2024, which claims the benefit of U.S. patent application Ser. No. 18/140, 259, titled "Instrumentation Using Access Time Value," filed on Apr. 27, 2023, the entire disclosures of which are incorporated herein by reference.

TECHNICAL FIELD

Embodiments pertain to computer architecture. Some embodiments relate to instrumentation using access time value.

BACKGROUND

Applications that are executed on a computer may access files. Identifying the files that are accessed by an application may be useful, for example, in computer security to detect unusual behavior of applications. Techniques for identifying files accessed by an application may be desirable.

BRIEF DESCRIPTION OF THE DRAWINGS

FIG. 4 illustrates a second example computing environment for instrumentation using access time value, in accordance with some embodiments.

FIG. 6 illustrates a fourth example computing environment for instrumentation using access time value, in accordance with some embodiments.

DETAILED DESCRIPTION

Figure 1:
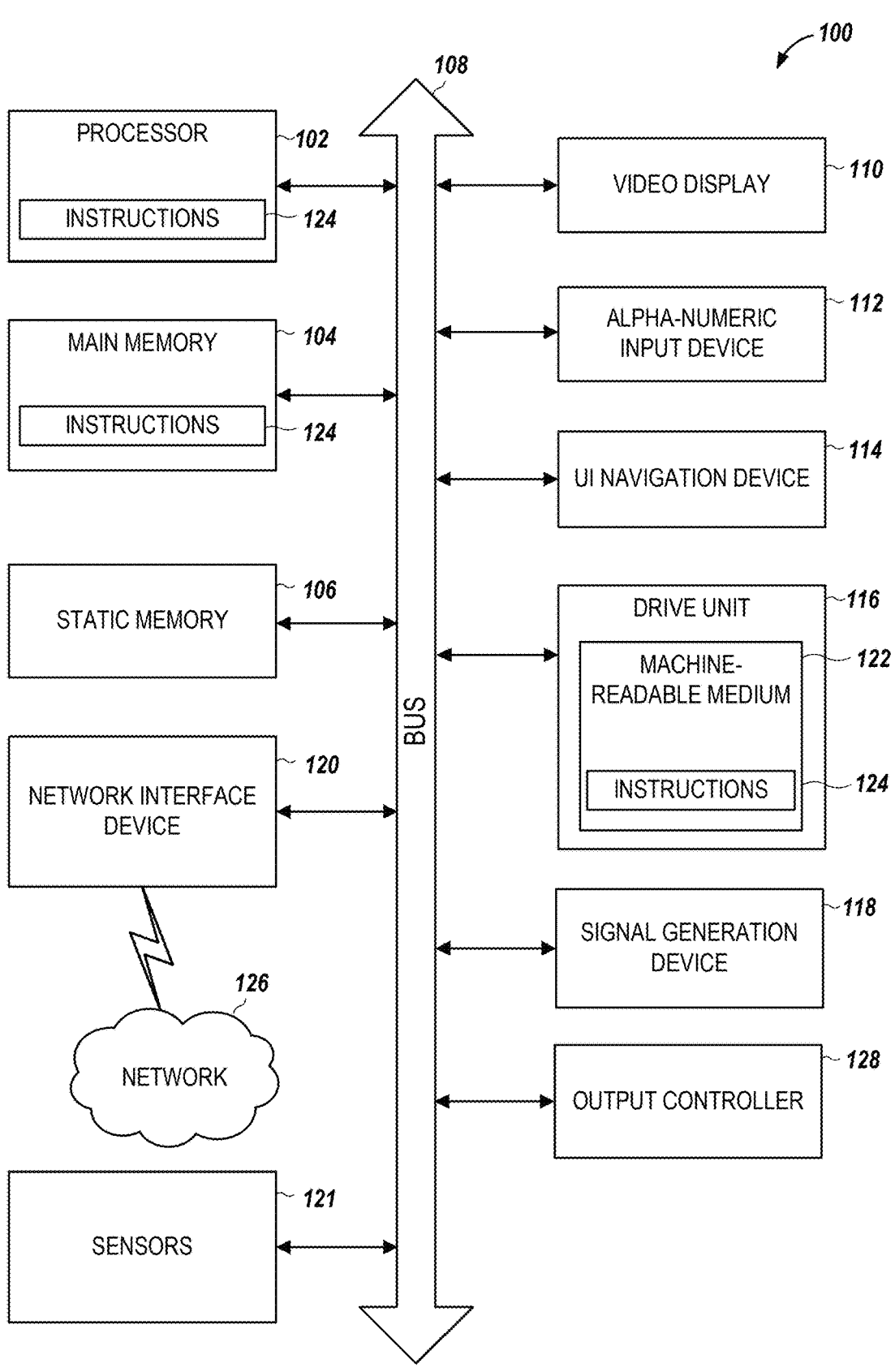
FIG. 1 is a block diagram of a computing machine, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some implementations relate to instrumentation using access time (atime) value. The access time value is stored in a field of metadata of a file and typically indicates a time when the file was accessed. If a file was not accessed, the atime may be set to an initial value. In some implementations, a computer identifies a subset of files which are accessed by a set of executables (e.g., from an application). The computer sets the atime for a set of files to the initial value. The computer then runs the set of executables. Upon accessing a file from the set of files by the set of executables, the kernel of the computer sets the atime to a new value in response to determining that at least one of the following is true: an initial access of the file is occurring, a current modification time (mtime) is younger than the access time before setting the access time to the new value, a current change time (ctime) is younger than the access time before setting the access time to the new value, or the access time before setting the access time to the new value is at least a threshold time period before a current time. The computer determines that the set of executables accessed a subset of files from the set of files for which the atime is different from the initial value. The computer provides an output representing the subset of files.

There are many situations in which it is useful to identify files that are accessed by an application. By way of example only, the techniques described herein may be used for detecting unusual, non-nominal or unexpected behavior of an application, for example to detect malicious activity, or for debugging an application. By way of example only, the techniques described herein may be used to "harden" an application by blocking access, of the application, to certain files, ports, network resources, or other computing environment resources.

According to some implementations, an instrumented application includes the set of executables. The instrumented application is an instrumentation of an original application. Setting the access time for the set of files to the initial value is accomplished by software that intercepts the instrumented application at a beginning of execution of a first executable from the set of executables. Determining that the set of executables accessed the subset of files (i.e., identifying the subset of files accessed by the set of executables) is accomplished by software that intercepts the instrumented application at an end of execution of a second executable from the set of executables.

An instrumentation may include the output of an instrumentation procedure. An instrumentation may include a stub, which provides the instrumentation functionality to the original, as well as the original itself. Instrumentation of an original (e.g., application or executable) may include generating a stub and combining the stub with the original. The output of an instrumentation procedure may include two components—the stub and the original. After instrumentation, the combination of the stub and the original takes the original's place. The input that was sent to the original is now sent to the stub. The output that was received from the original is now received from the stub. The stub may add, delete or modify the functionality of the original. In some implementations, the stub adds the functionality to perform the identification of the accessed files. The output of the instrumentation procedure could combine the stub and the original as a single object or as separate objects. Table 1 summarizes some terms related to instrumentation and non-limiting example definitions for these terms. It should be noted that the definition of any of these terms is not limited to the provided definition.

TABLE 1

| | Term | Non-limiting example definition |
|---|---|---|
| 1 | instrumentation of an executable | The total output file(s) (or other data structures) of instrumentation of an |
| 2 | executable instrumentation | executable. The output may be, for example, a single file or multiple files or other |
| 3 | instrumented executable | data structure(s). The content may include the stub and the original executable |
| 4 | instrumentation of an application | The total output file(s) of instrumentation of all files which make up the application. |
| 5 | instrumented application | The output file(s) may include the stubs of the file(s) and the original file(s) |
| 6 | instrumentation of an application image | The image file including the total output file(s) of instrumentation of all files in the application image |
| 7 | application image instrumentation | |
| 8 | instrumented application image | |
| 9 | original | The part of the instrumentation output that corresponds to the object(s) to which the instrumentation procedure has been applied |
| 10 | stub | The part of the instrumentation output that provides functionality to the original, the functionality including accessed file identification and, in some cases, identification of accessed system calls, runtime environment variables, or network traffic |
| 11 | stub of an executable | The stub part of the output of instrumentation of an executable |
| 12 | executable stub | |
| 13 | stub of an application | The stub part of the total output of instrumentation of an application |

Atime instrumentation, as disclosed herein, may make use of a file's access time timestamp, a kernel feature which records a time when a file is accessed. This timestamp is stored in a file's metadata, in some cases, along with other data, such as file size, file owner's user identifier (ID), group ID, or the like. Atime support may depend on the filesystem. Some filesystems (e.g., some Linux filesystems, such as ext2, ext3, ext4, btrfs xfs, and zfs) have a field to store access time in a file's metadata. Other filesystems (e.g., FAT32) might not support atime.

Atime support may depend on the mount option. In some implementations which use Linux operating system, if a volume is formatted in a file system with atime support, but is mounted with -noatime mount option, the kernel does not update the atime. There are other mount options (e.g., -relatime, -strictatime or -lazyatime) that may affect how often the kernel updates atime and when the update is written to the disk. In some cases, when the -strictatime mount option is used, atime may be updated every time a file is accessed. However, the -strictatime mount option may cause excessive atime update and result in performance penalty. Another mount option, -relatime, causes the kernel not to update atime if the atime has been updated recently. The -relatime mount option strikes a balance between-strictatime and -noatime. The -relatime mount option is implemented in some versions of the Linux operating system.

According to some implementations, atime instrumentation may include three main operations: initialization, instrumentation, and data collection. In the initialization operation, at the beginning of an instrumentation session (application image run), the atime of all the files in the file system (or the set of files that is of interest, which may be a portion of the files in the file system) is set to an initial value.

During the instrumentation operation, the computer runs the application as usual, and the kernel updates the atime of any file accessed (in some cases, subject to the file system support and mount option described above). Access may include, among other things, reading or writing the contents of a file, or executing a file (e.g., loading a program into the memory is a file read).

During the data collection operation, the atime time-stamps of all files (or the subset that is of interest) in the file system are rescanned, and the list of files whose atime have changed from the initial value is reported. The data collection operation may occur at the end of the instrumentation operation. Alternatively, the instrumentation operation may be completed over a long period of time (e.g., several months), and the data collection operation may be conducted periodically during the instrumentation operation. For example, the data collection operation may be conducted in response to a request by a user or according to a predetermined schedule (e.g., every day at 3:00 am).

The instrumentation operation may be handled, at least in part, by the kernel. The kernel may handle the atime update, including making decisions on whether to update the atime and actually performing the update. However, the kernel does not generate the list of files of which the atime values have changed. Instrumentation includes measurement. The kernel does not measure anything, but generates the events for measurement. An engine implementing the initialization operation intercepts the application image run at the beginning and an engine implementing the data collection operation intercepts the application image run at the end. The engine implementing the initialization operation and the engine implementing the data collection operation may be the same engine or different engines.

When a programmer builds an application image, the programmer may specify a default command line or a default entry point in the application image (i.e. the place in the application where the execution of application begins). When a user of the computer executes the application image without specifying, to a computing environment manager (e.g., the container manager, for example, Docker or Kubernetes) which program to run, a default command or entry point may be used. The user may also override the default setting by providing another command to run. The computing environment manager may then start at that command instead of following the default setting of the application image.

According to some implementations, a computing environment manager overrides an application image's default entry point with an instrumentation engine. This variation might not leverage generating a stub of the application image. The instrumentation engine is placed in an external volume. The computer then runs the original application image, but the computing environment manager mounts the external volume containing the main wrapper, then overrides the default entry point with the main wrapper. In other implementations, instead of mounting an external volume comprising the instrumentation engine, the instrumentation engine is added to the original application image, which remains unstubbed. The computing environment manager starts the updated image with the main wrapper as the entry point.

As used herein, the term "instrumentation" encompasses its plain and ordinary meaning. Instrumentation may refer to the measure of an engine's or an application's performance, in order to diagnose errors and to write trace information. Instrumentation may include identifying files accessed by an engine or an application during execution. Instrumentation of data (e.g., a file, an application or an application image) may include generating a stub of the data and the original of the data. The stub may add to the functionality of the original, delete from the functionality of the original or modify the functionality of the original. Unstubbing may refer to removing the stub and restoring the original. The term "instrumentation" or the phrase "application instrumentation" may also refer to the total output of the instrumentation process as described herein, including the original and the stub. Furthermore, the term "instrumentation" or the phrase "instrumentation operation" also encompasses the act of measurement, for example, in identifying the files that were accessed by an application.

As used herein, the term "computing environment" encompasses its plain and ordinary meaning. A computing environment may include at least one of a physical computer, a virtual machine, or a container. A computing environment may be managed by a computing environment manager, for example, a container manager (e.g., Kubernetes or Docker Swarm) or a virtual machine manager (e.g., VMware Workstation, VirtualBox, Hyper-V, Kernel-based Virtual Machine (KVM), or Xen).

As used herein, the term "application" encompasses its plain and ordinary meaning. An application may include a collection of program(s) and/or data that provide a desired functionality in a computing environment. The term "application" may refer to the functionality which the collection of program(s) and/or data provide. The term "application" may refer to the collection of program and/or data files which comprise the contents of an application image. The term "application image" may refer to a packaged file (or another data structure) comprising those contents.

As used herein, the terms "application image" or "application image file" encompass their plain and ordinary meaning. The "application image" or "application image file" may refer to an image file including a collection of program (s) and/or data that provide a desired functionality when instantiated in a computing environment.

As used herein, the phrase "stub application" refers, among other things, to an application that is constructed based on an original application. The stub may add to, delete from or modify the functionality of the original. For example, a thermometer application may access thermometer hardware to obtain a temperature reading. A stub of the thermometer application may lack access to the thermometer hardware and may simply return the value 24 Celsius (regardless of the actual temperature). As a result, the stub may be used to test the code and/or study how the code operates.

An application may include multiple executables. One instrumentation technique generates an instrumented application that includes stubs for the executables as well as the originals. The instrumented application may be intercepted with an instrumentation engine at the beginning of its execution and at the end of its execution to perform some implementations of instrumentation disclosed herein. This technique allows any of the executables to be the executable that is the first to start at the beginning of running the application and/or the executable that is the last to exit at the end of running the application. In some cases, this technique includes an unstubbing procedure which restores all instrumented executables with their originals. After unstubbing, the executables are found in their original storage locations, thereby eliminating path translation, according to some embodiments.

Another instrumentation technique instruments one executable (e.g., the main executable) of an application. In this technique, the instrumented executable is the first executable to execute at the start of the application and the last executable to execute upon exit from the application. The entry and the exit point for the instrumentation engine is in the instrumented executable. Some implementations leverage the process which is the last to exit. The instrumented executable intercepts the beginning and the end of the application image run.

An instrumented application may access a temporary instantiated storage including a storage view of a running computing environment. During unstubbing, all content items (e.g., executables) in the temporary instantiated storage (whose contents prior to unstubbing contain the stub of the application image) are made to appear in their original locations as in the original, unstubbed application image. Restoring the entire storage to the original, unstubbed, state is one of the ways to achieve this. However, as long as all executables or other content items can be found in their original locations, other instrumentation-related files may remain untouched. This may reduce or eliminate the use of path translation. When the instrumented application is instantiated in a computing environment, in some cases, the computing environment manager mounts the instrumented application image into a temporary instantiated storage and starts the entry point program. Therefore, prior to unstubbing, the contents of the temporary instantiated storage are, partially or fully, the files in the instrumented application image. It should be noted that the instrumented application contains both the stubs and the originals of the files in the original application image. As explained in detail below, there are different ways to arrange the stub and the original in the instrumented application. However, when running an executable using the original file path found in the original application image, it is the executable's stub that is executed. The unstubbing operation reverts this so that the original executable is executed. After unstubbing, running an executable using the original path found in the original application image causes running of the original executable.

As used herein, the term "kernel" encompasses its plain and ordinary meaning. The term "kernel" may refer to a core part of an operating system that controls and manages system resources such as the central processing unit (CPU), memory, and input/output devices. It acts as a bridge between applications and the underlying hardware, providing a layer of abstraction that allows programs to interact with the system without having to deal with the low-level details of hardware management. The kernel is responsible for managing processes, handling interrupts, managing memory, scheduling tasks, and providing a range of other essential services to the operating system and applications. It is typically loaded into memory at boot time and remains in memory throughout the system's operation. The design and implementation of a kernel can vary greatly depending on the specific operating system and its intended use case. Some kernels are monolithic, where all the essential services are provided within a single codebase, while others are microkernels, where only a minimal set of services are provided in the kernel, and other services are implemented as separate user-space processes.

An application image may include multiple executables and/or data files. In some case, the executables that are being executed are loaded into memory. When a user executes an application image, the user uses a computing environment manger to instantiate the application image, i.e., to set up an isolated computing environment to run the image. This may involve reserving system resources (e.g., memory, processing units(s), network, etc.). This may involve setting up a temporary instantiated storage and mounting the application image into the storage. Any new files or file changes are written to the temporary storage. When the computing environment terminates, the temporary data and any changes to previously existing data in the temporary data are removed. Based on the above, the computing environment has all the necessary system resources to have a process execute the application image and a temporary instantiated storage through which all files in the application image are accessible. The computing environment manager loads the entry point program (either the default one specified in the image, or if manual override is requested, the user specified entry point) and begins execution.

As used herein, a "process" may include one or more threads running an instance of one or more computer programs. A thread is a sequence of programmed instructions that can be managed independently by a scheduler, which may be a part of the operating system. Some operating systems operate multiple threads in parallel. Some operating systems operate threads serially. The one or more threads of a given process may be executed concurrently (via multi-threading capabilities), sharing resources such as memory, while different processes might not share these resources.

Aspects of the present technology may be implemented as part of a computer system. The computer system may be one physical machine, or may be distributed among multiple physical machines, such as by role or function, or by process thread in the case of a cloud computing distributed model. In various embodiments, aspects of the technology may be configured to run in virtual machines that in turn are executed on one or more physical machines. It will be understood by persons of skill in the art that features of the technology may be realized by a variety of different suitable machine implementations.

The system includes various engines, each of which is constructed, programmed, configured, or otherwise adapted, to carry out a function or set of functions. The term engine as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operations described herein in connection with that engine.

Considering examples in which engines are temporarily configured, each of the engines may be instantiated at different moments in time. For example, where the engines comprise a general-purpose hardware processor core configured using software, the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

This document may reference a specific number of things (e.g., "six mobile devices"). Unless explicitly set forth otherwise, the numbers provided are examples only and may be replaced with any positive integer, integer or real number, as would make sense for a given situation. For example, "six mobile devices" may, in alternative embodiments, include any positive integer number of mobile devices. Unless otherwise mentioned, an object referred to in singular form (e.g., "a computer" or "the computer") may include one or multiple objects (e.g., "the computer" may refer to one or multiple computers).

FIG. 1 illustrates a circuit block diagram of a computing machine 100 in accordance with some embodiments. In some embodiments, components of the computing machine 100 may store or be integrated into other components shown in the circuit block diagram of FIG. 1. For example, portions of the computing machine 100 may reside in the processor 102 and may be referred to as "processing circuitry." Processing circuitry may include processing hardware, for example, one or more central processing units (CPUs), one or more graphics processing units (GPUs), and the like. In alternative embodiments, the computing machine 100 may operate as a standalone device or may be connected (e.g., networked) to other computers. In a networked deployment, the computing machine 100 may operate in the capacity of a server, a client, or both in server-client network environments. In an example, the computing machine 100 may act as a peer machine in peer-to-peer (P2P) (or other distributed) network environment. In this document, the phrases P2P, device-to-device (D2D) and sidelink may be used interchangeably. The computing machine 100 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 100 may include a hardware processor 102 (e.g., a central processing unit (CPU), a GPU, a hardware processor core, or any combination thereof), a main memory 104 and a static memory 106, some or all of which may communicate with each other via an interlink (e.g., bus) 108. Although not shown, the main memory 104 may contain any or all of removable storage and non-removable storage, volatile memory or non-volatile memory. The computing machine 100 may further include a video display unit 110 (or other display unit), an alphanumeric input device 112 (e.g., a keyboard), and a user interface (UI) navigation device 114 (e.g., a mouse). In an example, the display unit 110, input device 112 and UI navigation device 114 may be a touch screen display. The computing machine 100 may additionally include a storage device (e.g., drive unit) 116, a signal generation device 118 (e.g., a speaker), a network interface device 120, and one or more sensors 121, such as a global positioning system (GPS) sensor, compass, accelerometer, or other sensor. The computing machine 100 may include an output controller 128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 116 (e.g., a storage device) may include a machine readable medium 122 on which is stored one or more sets of data structures or instructions 124 (e.g., software) embodying or utilized by any one or more of the techniques or functions described herein. The instructions 124 may also reside, completely or at least partially, within the main memory 104, within static memory 106, or within the hardware processor 102 during execution thereof by the computing machine 100. In an example, one or any combination of the hardware processor 102, the main memory 104, the static memory 106, or the storage device 116 may constitute machine readable media.

While the machine readable medium 122 is illustrated as a single medium, the term "machine readable medium" may include a single medium or multiple media (e.g., a centralized or distributed database, and/or associated caches and servers) configured to store the one or more instructions 124.

The term "machine readable medium" may include any medium that is capable of storing, encoding, or carrying instructions for execution by the computing machine 100 and that cause the computing machine 100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 124 may further be transmitted or received over a communications network 126 using a transmission medium via the network interface device 120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 120 may include one or more physical jacks (e.g., Ethernet, coaxial, or phone jacks) or one or more antennas to connect to the communications network 126.

Figure 2:
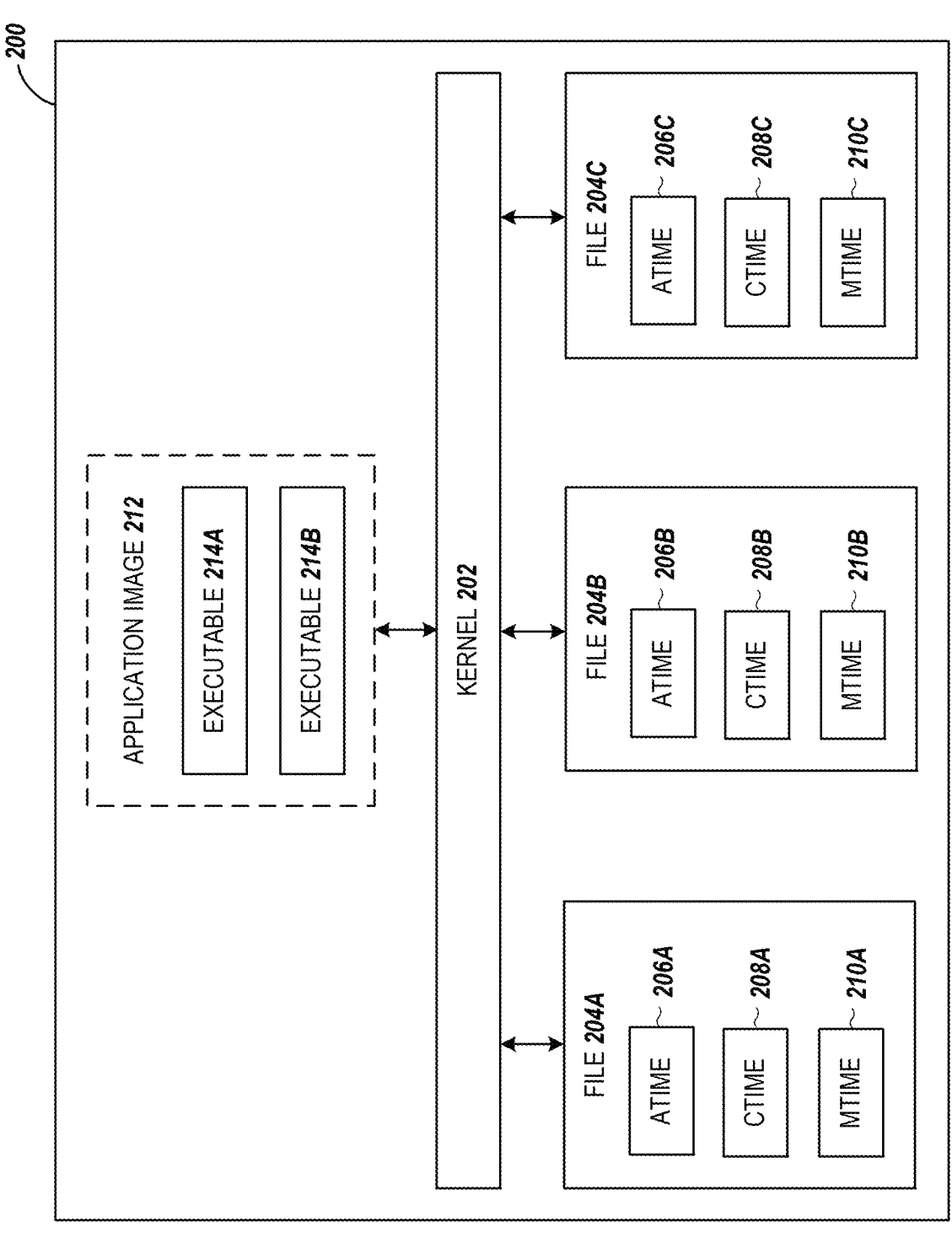
FIG. 2 illustrates an example computing environment including an application image and files, in accordance with some embodiments.

FIG. 2 illustrates an example computing environment 200, in accordance with some embodiments. The computing environment 200 may be implemented in a virtual machine-based or container-based environment or using the computing machine 100 illustrated in FIG. 1. In some cases, the virtual machine-based environment or the container-based environment runs on top of the computing machine 100. As shown, the computing environment 200 includes a kernel 202, and files 204A-204C. The file 204A includes, as metadata, an atime 206A, a ctime 208A, and a mtime 210A. The atime 206A indicates a time when the file 204A was last accessed. The ctime 208A indicates a time when metadata (e.g., inode information, for instance, owner, group, link count or mode) of the file 204A was last changed. The mtime 210A indicates a latest time when content (e.g., more than zero bytes) of the file 204A was last modified. The mtime 210A might not be changed for changes in owner, group, hard link count or mode. Similarly, the file 204B includes, as metadata, an atime 206B, a ctime 208B, and a mtime 210B. The file 204C includes, as metadata, an atime 206C, a ctime 208C, and a mtime 210C. While three files 204A-204C are illustrated, the technology disclosed herein may be implemented with other numbers of files.

As shown, an application image 212 is instantiated in the computing environment 200. The computing environment 200 includes the contents of the application image 212. The application image 212 is illustrated in dashed lines to indicate that the application image 212 itself is not visible via the computing environment 200. The application image 212 includes executables 214A-214B that are executed during running the application image 212. The executables 214A-214B are visible via the computing environment 200. During running the application image 212, the executable 214A executes first. The executable 214B is the last executable to exit in the session. While two executables 214A-214B are illustrated, the technology disclosed herein may be implemented with other number of executables. When the application image 212 is running, the processes in the running application image 212 accesses all or a portion of the files 204A-204C via the kernel 202. Some implementations of the technology disclosed herein are directed to identifying the accessed files 204A-204C by using the atimes 206A-206C of the files. Examples of these implementations are discussed in conjunction with FIGS. 3-6. The files 204A-204C are illustrated as being outside the application image 212. However, in some implementations, some or all of the files 204A-204C reside inside the application image 212.

In some cases, a process can change the executable it is running via an exec( ) system call, which loads the specified executable file into the process' memory space, replacing its current content, and begins executing that newly loaded program using the current process' context. The exec( ) calling process may be transformed into a different program following the exec( ) system call. This can occur one or multiple times during a process' lifetime, resulting in the executable 214B at process exit potentially (but not necessarily) being different from the executable 214A at process start. Process' lives vary. Some are long-running and some are short-lived. A process that starts early might or might not exit earlier than later starting processes. The last executable or process to begin running is not necessarily the executable or process to exit last.

In the computing environment 200, the kernel is a central component of the operating system that manages system resources and provides an interface for applications, including the application image 212, to interact with those resources. One of the resources that the kernel manages is the files 204A-204C, which are stored on storage devices such as hard drives or solid-state drives. The files may be stored in the main memory 104, the static memory 106 or the drive unit 116, as illustrated in FIG. 1.

When a process in the running application image 212 reads or writes a file (e.g., the file 204A), the process in the running application image 212 makes a system call to the kernel 202, which then performs the necessary operations on the file. For example, if a process of the running application image 212 opens the file 204A for reading, the process leverages the "open" system call of the kernel 202, passing in the name of the file 204A and any additional options such as read-only or write access. The kernel 202 then locates the file 204A on the storage device (e.g., the main memory 104, the static memory 106 or the drive unit 116), check permissions to ensure the process has the requested access, and create a file descriptor that the process uses to read or write the file 204A.

When an application corresponding to the application image 212 is executed, the kernel 202 loads one or more executables (e.g., the executables 214A-214B) from the application image 212 into memory and sets up the necessary data structures to allow the application to run.

As used herein, executing the application image 212 may include using a computing environment manager (e.g., of the computing environment 200) to instantiate the application image 212, i.e., to set up an isolated computing environment to run the application image 212. This may include reserving system resources (e.g., memory, processors, and/or network resources). This may include setting up a temporary instantiated storage and mounting the application image 212 into this storage. The computing environment 200 now has the assigned system resources and the temporary instantiated storage through which all of the files in the application image 212 are accessible. Then, the computing environment manager loads the entry point program (either the default one specified in the application image or a user-specified entry point program if an override is requested) and begins execution. The entry point program may correspond to the executable 214A.

Aspects of the technology disclosed herein are described as having file access mediated by a kernel (e.g., the kernel 202). However, in alternative implementations, the files may reside on a remote server and may be accessed via a network.

Figure 3:
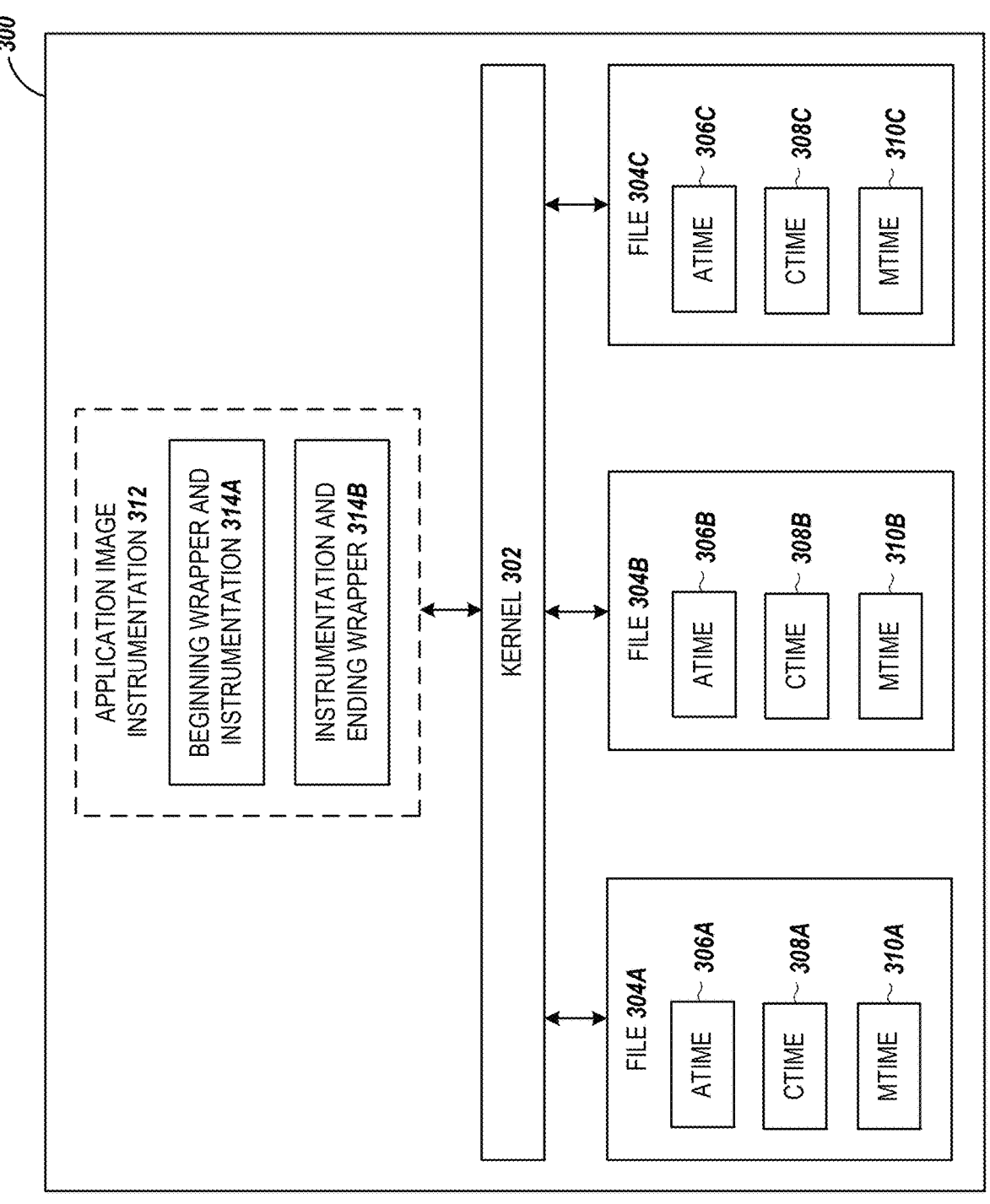
FIG. 3 illustrates a first example computing environment for instrumentation using access time value, in accordance with some embodiments.

FIG. 3 illustrates a first example computing environment 300 for instrumentation using access time value, in accordance with some embodiments. The computing environment 300 may correspond to a modified version of the computing environment 200 that is used for testing or controlled software execution. For example, in a virtual machine context, the virtual machine corresponding to the computing environment 300 may be a copy (e.g., of the virtualized hardware) with some modifications (e.g., to software and/or stored data) of the virtual machine corresponding to the computing environment 200. The computing environment 300 may have the same virtual and/or physical hardware as the computing environment 200. However, the computing environment 300 is instantiated from different images than the computing environment 200 and, thus, might include different software.

As shown, the computing environment 300 includes a kernel 302 corresponding to the kernel 202. The computing environment 300 includes files 304A-304C that correspond to the files 204A-204C, with the file 304A having atime 306A, ctime 308A, and mtime 310A. Similarly, the file 304B has atime 306B, ctime 308B, and mtime 310B. The file 304C has atime 306C, ctime 308C, and mtime 310C.

The application image instrumentation 312 is an instrumentation (including a stub and the original) of the application image 212. The application image instrumentation 312 includes instrumentations, which includes stubs corresponding to executables (e.g., the executables 214A-214B) in the application image 212 and their originals (e.g., the executables 214A-214B) from which the stubs were generated and, in some cases, other instrumentation-related files. The application image instrumentation 312 is illustrated in dashed lines to indicate that the application image instrumentation 312 itself is not visible via the computing environment 300. Instead of the executable 214A (which executes first) from the application image 212, the application image instrumentation 312 includes a beginning wrapper and instrumentation 314A (with the instrumentation including the stub and the original of the executable 214A). Instead of the executable 214B (which is the last to exit)

from the application image 212, the application image instrumentation 312 includes an instrumentation and ending wrapper 314B (with the instrumentation including the stub and the original of the executable 214B). Each of the beginning wrapper and instrumentation 314A or the instrumentation and ending wrapper 314B may include a total output from an instrumentation procedure, which may include the stub, the original, and/or other files. Some implementations leverage separate-stub-unmodified-original-same-computing-environment instrumentation, as described in greater detail below. Alternatively, any other instrumentation technique described herein may be used. The files 304A-304C are illustrated as being outside the application image instrumentation 312. However, in some implementations, some or all of the files 304A-304C reside inside the application image instrumentation 312.

During running of the application image instrumentation 312, the beginning wrapper and instrumentation 314A are executed first and the instrumentation and ending wrapper 314B are the last to exit. During execution of the beginning wrapper and instrumentation 314A, the beginning wrapper sets the atime 306A-306C of the files 304A-304C to an initial value (e.g., a preset time (e.g., 09:00:00 AM on Jan. 1, 2020) or a time when the execution of the beginning wrapper and instrumentation 314A started). After this, the instrumentation (of the beginning wrapper and instrumentation 314A), and later the instrumentation (of the instrumentation and ending wrapper 314B) are executed. During execution, a process running the instrumentations (which include both the stub and the original) accesses a subset of the files 304A-304C. When a file (e.g., the file 304A) is accessed, the atime (e.g., the atime 306A) of the file may be updated to a new value (e.g., corresponding to the current time, a time after the initial value, or a value different from the initial value). Alternatively, in some cases, the atime might not be updated (e.g., if the atime was updated during a threshold time period (e.g., one hour) preceding a current time). At the end of the execution of the instrumentation (of the instrumentation and ending wrapper 314B), the ending wrapper determines that the instrumentations (corresponding to the executables 214A and 214B) accessed a subset of files from the set of files 304A-304C. The subset is identified, by the ending wrapper, based on the atime 306A-306C of files in the subset being different from the initial value. It should be noted that the ending wrapper is the last to exit, not necessarily the last to begin execution. Also, one implementation might use the same wrapper process to intercept the beginning and the end of an application image run. In this case, the executables for the beginning and the ending wrappers will be the same executable.

In some cases, an unstubbing procedure may be used to restore all instrumented executables (the beginning wrapper and instrumentation 314A, and the instrumentation and ending wrapper 314B) with their originals (the executable 214A and the executable 214B). After unstubbing, the original executables are found in their original storage locations, thereby potentially eliminating path translation. During unstubbing, a content item in temporary storage of the running application image instrumentation 312 is identified and made to appear in an original location of the content item in the original application (the application image 212) after setting, by the beginning wrapper, the access time for the set of files to the initial value.

Figure 4:
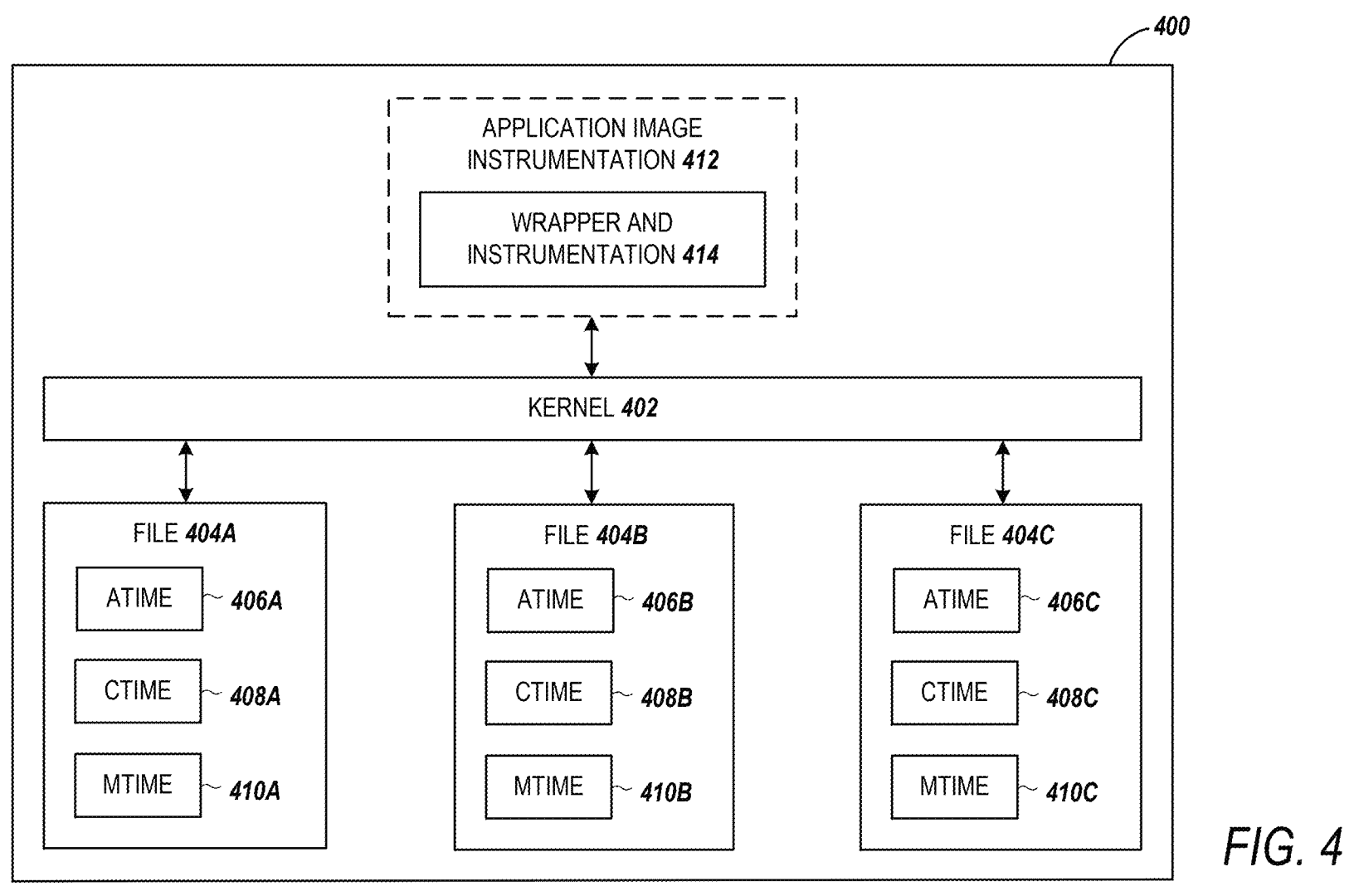

FIG. 4 illustrates a second example computing environment 400 for instrumentation using access time value, in accordance with some embodiments. The computing environment 400 may correspond to a modified version of the computing environment 200 that is used for testing or controlled software execution. For example, in a virtual machine context, the virtual machine corresponding to the computing environment 400 may be a copy with some modifications of the virtual machine corresponding to the computing environment 200. The computing environment 400 may have the same virtual and/or physical hardware as the computing environment 200. However, the computing environment 400 is instantiated from different images than the computing environment 200 and, thus, might include different software.

As shown, the computing environment 400 includes a kernel 402 corresponding to the kernel 202. The computing environment 400 includes files 404A-404C that correspond to the files 204A-204C, with the file 404A having atime 406A, ctime 408A, and mtime 410A. Similarly, the file 404B has atime 406B, ctime 408B, and mtime 410B. The file 404C has atime 406C, ctime 408C, and mtime 410C.

The application image instrumentation 412 is an instrumentation of the application image 212, which includes the stub and the original. The application image 412 is illustrated in dashed lines to indicate that the application image 412 itself is not visible via the computing environment 400. Instead of the executable 214A and the executable 214B from the application image 212, the application image instrumentation 412 includes a wrapper and instrumentation 414 (with the instrumentation including the stubs and the originals of the executables 214A-214B). The wrapper and instrumentation 414 incorporates the executables 214A and 214B, as well as a wrapper that performs the techniques disclosed herein. The instrumentation (of the wrapper and instrumentation 414) may include a total output from an instrumentation procedure (e.g., a stub, an original, and/or other instrumentation-related files), not necessarily a single file. Some implementations leverage separate-stub-unmodified-original-same-computing-environment instrumentation, as described in greater detail below. Alternatively, any other instrumentation technique described herein may be used. The files 404A-404C are illustrated as being outside the application image instrumentation 412. However, in some implementations, some or all of the files 404A-404C reside inside the application image instrumentation 412.

During running of the application image instrumentation 412, the wrapper and instrumentation 414 are executed. During execution of the wrapper and instrumentation 414, the wrapper sets the atime 406A-406C of the files 404A-404C to an initial value (e.g., 09:00:00 AM on Jan. 1, 2020). After this, the instrumentation (of the wrapper and instrumentation 414) is executed. During execution, the instrumentation (which includes both the stub and the original) accesses a subset of the files 404A-404C. When a file (e.g., the file 404A) is accessed, the atime (e.g., the atime 406A) of the file may be updated to a new value (e.g., a value corresponding to the current time or a value that is different from the initial value). Alternatively, in some cases, the atime might not be updated (e.g., if the atime was updated during a threshold time period (e.g., one hour) preceding a current time). At the end of the execution of the instrumentation, the wrapper determines that the instrumentation accessed a subset of files from the set of files 404A-404C. The subset is identified, by the wrapper, based on the atime 406A-406C of files in the subset being different from the initial value.

The implementation illustrated in FIG. 4 differs from that illustrated in FIG. 3 in that a single wrapper and instrumentation 414, rather than the two blocks—beginning wrapper and instrumentation 314A and instrumentation and ending wrapper 314B—are generated. The single wrapper may correspond to the only single executable of the application image instrumentation 412. Alternatively, the application image instrumentation 412 may include multiple executables, with the same instrumentation (corresponding to the instrumentation of the wrapper and instrumentation 414) being executed at the beginning and at the end of running the application image instrumentation 412.

Figure 5:
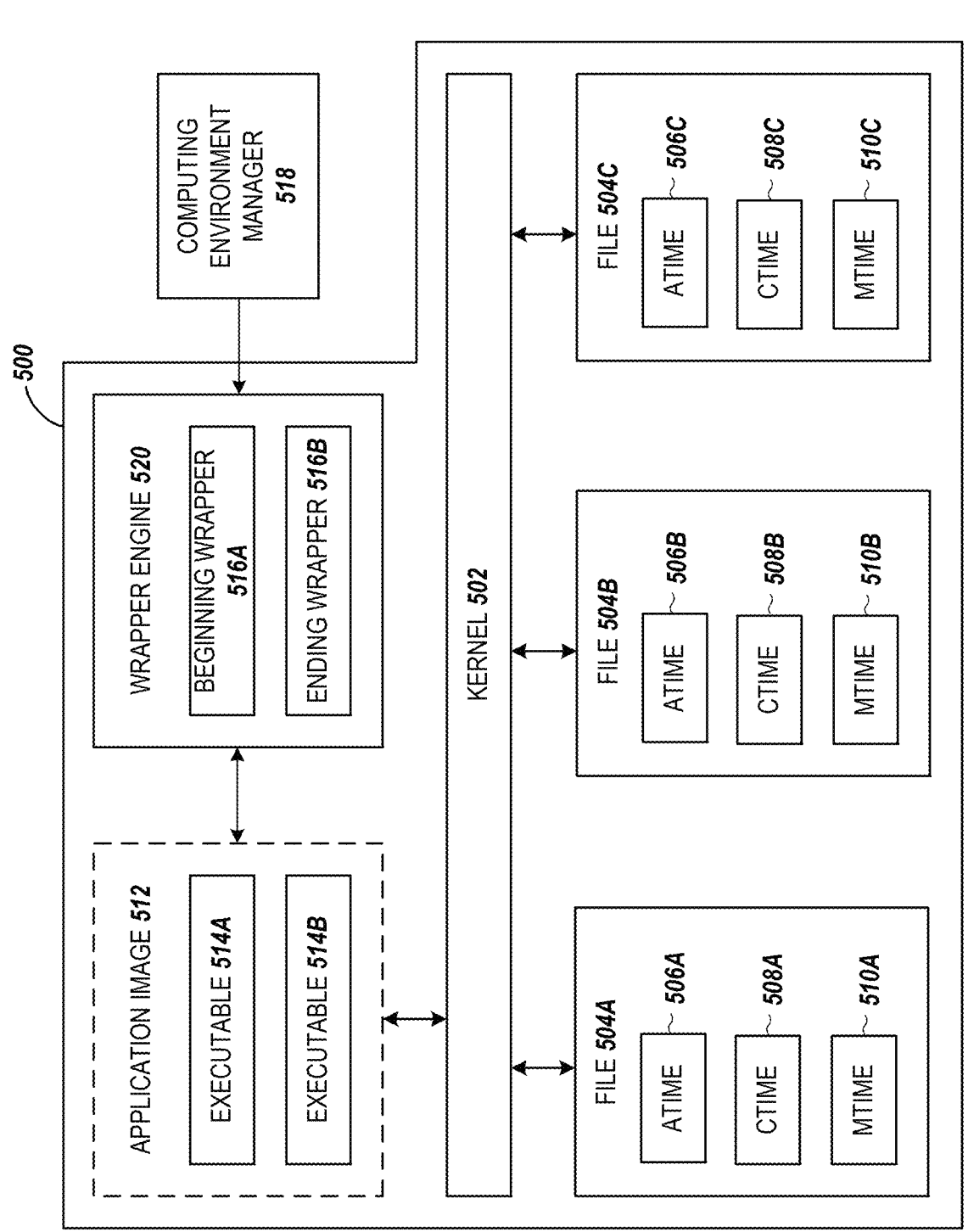
FIG. 5 illustrates a third example computing environment for instrumentation using access time value, in accordance with some embodiments.

FIG. 5 illustrates a third example computing environment 500 for instrumentation using access time value, in accordance with some embodiments. The computing environment 500 may correspond to a modified version of the computing environment 200 that is used for testing or controlled software execution. Similarly to the computing environment 200 of FIG. 2, the computing environment 500 includes a kernel 502, which has access to files 504A-504C. Each file 504A-504C includes an atime 506A-506C, a ctime 508A-508C, and a mtime 510A-510C.

As shown, the computing environment 500 includes files from an application image 512 (corresponding to the application image 212) with executables 514A-514B (corresponding to the executables 214A-214B) as well as a beginning wrapper 516A and an ending wrapper 516B. the beginning wrapper 516A and the ending wrapper 516B are mounted into the computing environment 500 from an external volume. The application image 512 is illustrated in dashed lines to indicate that the application image 512 itself is not visible via the computing environment 500. Upon running the application image 512, the beginning wrapper 516A is executed prior to running the executables 514A-514B, and the ending wrapper 516B is executed post running the executables 514A-514B. As shown, a wrapper engine 520, inside the computing environment 500, houses the beginning wrapper 516A and the ending wrapper 516B. The beginning wrapper 516A and the ending wrapper 516B may be placed into a folder (or other data structure) along with other instrumentation tools. Upon starting the application image 512, the computing environment manager 518 mounts this folder into the computing environment 500 so the folder becomes visible to the programs inside the computing environment 500. In some cases, the user instructs the computing environment manager 518 to override the entry point to point to the beginning wrapper 516A, which resides in the externally mounted volume. (Alternatively, these instructions may be preprogrammed and may be executed without user involvement.) The computing environment manager 518 controls a default entry point and a default exit point of running the application image 512 (and other application images in the computing environment 500). The files 504A-504C are illustrated as being outside the application image 512. However, in some implementations, some or all of the files 504A-504C reside inside the application image 512.

The computing environment 500 may have the same virtual and/or physical hardware as the computing environment 200. However, the computing environment 500 is instantiated from different images than the computing environment 200 and, thus, might include different software.

Before running the executables 514A-514B, the beginning wrapper 516A sets the atimes 506A-506C of the files 504A-504C to the initial value. During running the executables 514A-514B, the executables 514A-514B access some of the files 504A-504C, possibly updating the atimes 506A-506C of the accessed files 504A-504C. After running the executables 514A-514B, the ending wrapper 516B determines the subset of the files 504A-504C accessed by the executables 514A-514B based on the atimes 506A-506C of the files 504A-504C that were accessed being different from the initial value.

As illustrated, the wrapper engine 520 is external to the application image 512. In some implementations, the wrapper engine 520 may be incorporated into the application image 512, thereby becoming a component of the application image 512.

In a first example case, the wrapper engine 520 is added to the application image 512. In this case, the wrapper engine 520 is visible in the computing environment 500 and can be set as the entry point upon running the application image 512.

In a second example case, the wrapper engine 520 is external to the application image 512, but is mapped into the computing environment 500 by specifying start options to the computing environment manager 518. In this case, the wrapper engine is also visible in the computing environment 500 and can be set as the entry point upon running the application image 512.

In a third example case, the wrapper engine 520 is external to the application image 512, and is not mapped into the computing environment 500. It should be noted that the wrapper engine 520 is illustrated in FIG. 5 as being inside the computing environment 500. However, in accordance with the third example case and some implementations of the disclosed technology, the wrapper engine 520 resides externally to the computing environment 500.

FIG. 6 illustrates a fourth example computing environment 600 for instrumentation using access time value, in accordance with some embodiments. The computing environment 600 may correspond to a modified version of the computing environment 200 that is used for testing or controlled software execution. Similarly to the computing environment 200 of FIG. 2, the computing environment 600 includes a kernel 602, which has access to files 604A-604C. Each file 604A-604C includes an atime 606A-606C, a ctime 608A-608C, and a mtime 610A-610C. The computing environment 600 may have the same virtual and/or physical hardware as the computing environment 200. However, the computing environment 600 is instantiated from different images than the computing environment 200 and, thus, might include different software.

As shown, the computing environment 600 includes an application image 612 (corresponding to the application image 212) with executables 614A-614B (corresponding to the executables 214A-214B). The application image 612 is illustrated in dashed lines to indicate that the application image 612 itself is not visible via the computing environment 600. The application image 612 also includes a beginning wrapper 616A that executes before the executables 614A-614B and an ending wrapper 616B that executes after the executables 614A-614B. The beginning wrapper 616A and the ending wrapper 616B are added to the application image 612 by the computing environment manager 618 (e.g., a container manager or a virtual machine manager), which executes outside the computing environment 600. The beginning wrapper 616A executes at the beginning of running the application image 612. The ending wrapper 616B executes at the end of running the application image 612. The computing environment manager 618 controls a default entry point and a default exit point of running the application image 612 (and other application images in the computing environment 600). The files 604A-604C are illustrated as being outside the application image 612. However, in some implementations, some or all of the files 604A-604C reside inside the application image 612.

Upon execution of the application image 612 and before running the executables 614A-614B, the beginning wrapper 616A sets the atimes 606A-606C of the files 604A-604C to the initial value. During running the executables 614A-614B, the executables 614A-614B access some of the files 604A-604C, possibly updating the atimes 606A-606C of the accessed files 604A-604C. After running the executables 614A-614B, the ending wrapper 616B determines the subset of the files 604A-604C accessed by the executables 614A-614B based on the atimes 606A-606C of the files 604A-604C that were accessed being different from the initial value.

As shown in FIG. 6, the beginning wrapper 616A and the ending wrapper 616B are separate wrappers. However, in some implementations, a single wrapper engine encompasses (e.g., performs the functionality of) both the beginning wrapper 616A and the ending wrapper 616B. Furthermore, the application image 612 is shown to include two executables 616A and 616B. However, in some implementations, the application image may include one executable, two executables, three executables or other numbers of executables.

Figure 7:
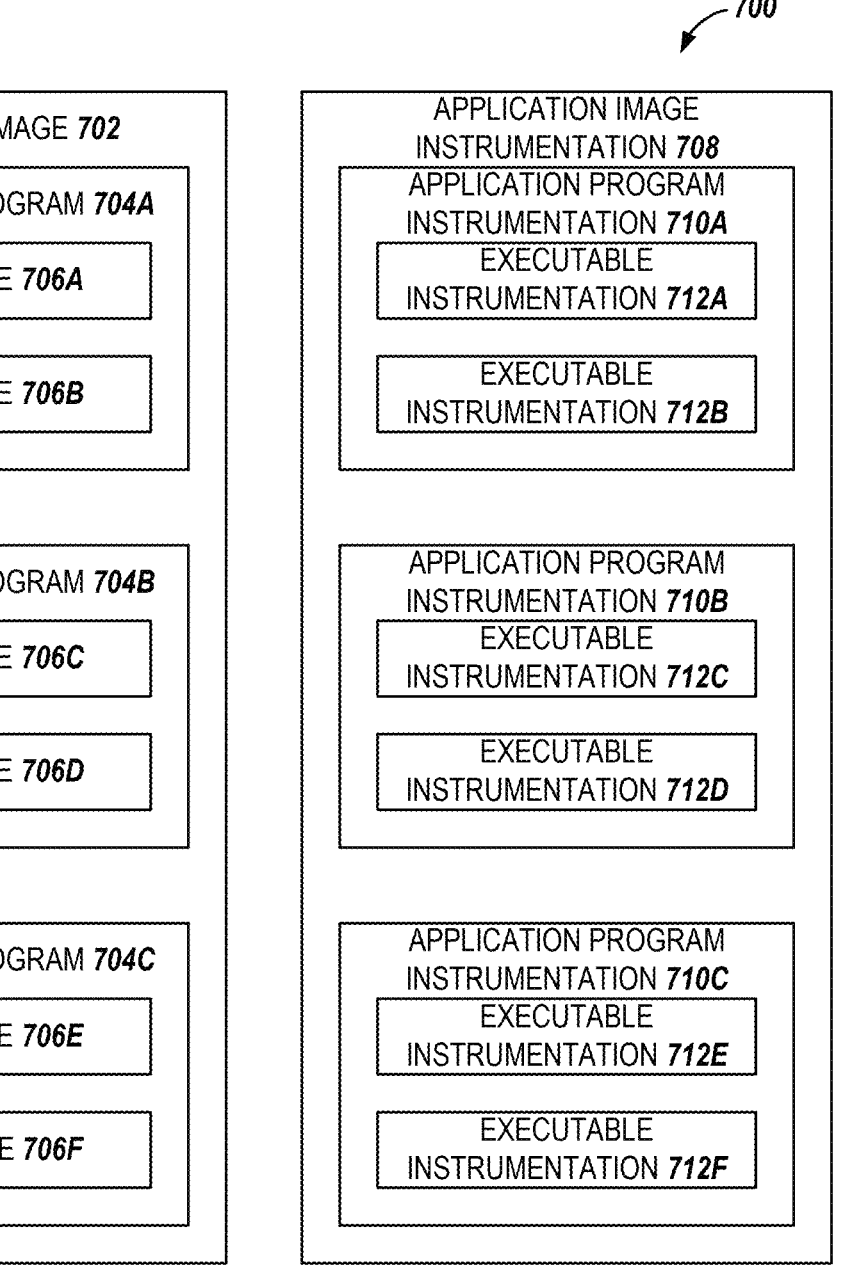
FIG. 7 illustrates an example of a static view of component files involved in instrumentation of an application image, in accordance with some embodiments.

FIG. 7 illustrates an example of a static view 700 of component files involved in instrumentation of an application image 702, in accordance with some embodiments. Instrumentation is used, for example, to generate the application image instrumentation 312 and/or the application image instrumentation 412 from the application image 212. The result of instrumentation may include both the stub and the original. As shown, the static view 700 includes an application image 702 (e.g., corresponding to the application image 212). The application image includes application programs 704A-704C, with each of the application programs 704A-704C including executables 706A-706F. FIG. 7 illustrates three application programs 704A-704C, with each application program 704A-704C including two executables 706A-706F (the application program 702A includes the executables 706A-706B, the application program 702B includes the executables 706C-706D, and the application program 704C includes the executables 706E-706F). However, in alternative implementations, there may be a different number of application programs or some or all of the application programs may include a different number of executables.

An application image instrumentation 708 (e.g., corresponding to the application image instrumentation 312 and/or the application image instrumentation 412) is generated based on the application image 702. The application image instrumentation 708 includes the application image 702 and a stub of the application image 702, which adds to, modifies, or deletes some of the functionality. The application image instrumentation 708 includes application program instrumentations 710A-710C corresponding to the application programs 704A-704C. The application program instrumentation 710A includes the original of the corresponding application program 704A and its stub. The application program instrumentations 710B, 710C are structured similarly to the application program instrumentation 710A. The application program instrumentations 710A-710C include executable instrumentations 712A-712F corresponding to the executables 706A-706F. The executable instrumentation 712A includes the original of the corresponding executable 706A and its stub. The executable instrumentations 712B-712F are structured similarly to the executable instrumentation 712A.

In one runtime behavior of the application image 702, the running application image 702 may send system service requests. In this case, a process running the executable 706A (or another one of the executables 706B-F) of the application image 702 sends requests through direct system calls, or through library calls which in turn make system call, into the operating system. It should be noted that, not all of the application programs 704A-704C in the application image 702 need to be running at the same time, and one program 704A can be started multiple times as multiple processes.

When running the application image instrumentation 708, each process may be instrumented independently according to the type of the executables 712A-712F used by the process. In some implementations of atime instrumentation techniques, the library calls and the system calls might not be intercepted. Some implementations relate to the placement of each constituent inside an image file, i.e., the file path of each file in the temporary instantiated storage upon instantiation of the application image in a computing environment. In the application image instrumentation 708, each executable stub (of the executable instrumentation 712A-712F) is placed in the location of the original executable the executable stub was generated from, and the original executable (i.e., the original executable 706A-706F from the application image 702) is moved to another location.

Instrumentation may start with an original executable (e.g., the executable 706A in the application image 702) and generate the corresponding instrumentation (e.g., the executable instrumentation 712A in the application image instrumentation 708) for the original (in addition to the original itself). Table 2 illustrates possible variations of instrumentation based on the form of the stub (which is a part of the instrumentation) and the original.

TABLE 2

| | | Original in unmodified form | Original in modified form |
|---|---|---|---|
| Combined stub & original | | a. Combined-stub-unmodified-original | b. Combined-stub-modified-original |
| Separate stub & original | in the same computing environment | c. separate-stub-unmodified-original-same-computing-environment | d. separate-stub-modified-original-same-computing-environment |
| | in different computing environments | e. separate-stub-unmodified-original-different-computing-environments | f. separate-stub-modified-original-different-computing-environments |

In combined-stub-unmodified-original instrumentation, the instrumentation procedure generates the stub and the original as a combined object. The original includes the combined object in unmodified form. An example instrumentation procedure of this type packages the wrapper (stub) and the wrapee (original) as a single file with the entry point set to the wrapper. The resultant instrumented file (the combined object) replaces the original executable in its location. Upon execution, the wrapper, after executing its additional functionality, executes the wrapee. To unstub such an instrumented file, the wrapee (original) is extracted from the instrumented file, and the extracted original replaces the instrumented file in its current location.

In combined-stub-modified-original instrumentation, the instrumentation procedure generates the stub and the original as a combined object. The combined object includes the original in a modified form. An example instrumentation procedure of this type patches the original executable so that it will jump to a wrapper code. The modified original and the wrapper is combined as a single executable without changing the entry point (the executable still begins execution from the original, which is now patched). The resultant instrumented file (the combined object) replaces the original executable in its location. Unstubbing such an instrumented file includes removing the wrapper and undoing the modification in the original. The restored original executable then replaces the instrumented file in its location.

Some implementations disclosed herein leverage separate-stub-unmodified-original-same-computing-environment instrumentation. In separate-stub-unmodified-original-same-computing-environment instrumentation, the instrumentation procedure generates a stub which will invoke the unchanged original. An example instrumentation procedure of this type generates a stub which replaces the original in its location. The original is moved to another location for the stub to invoke. Upon execution, the stub (wrapper), now in the original location, is executed. The stub executes its additional code, then invokes the original, now in the relocated location. Unstubbing such an instrumented file (including the stub and the original files) involves making the original reappear in the original location (i.e., by moving or copying files of the original).

In separate-stub-modified-original-same-computing-environment instrumentation, the instrumentation procedure generates a stub and a modified version of the original. An example instrumentation procedure of this type patches the original in-place. The patch intercepts the execution of the original in the beginning, then loads and executes the wrapper (stub). The wrapper is a separate executable, which is put in a separate path. Unstubbing such an instrumented file involves undoing the modification made to the original. The wrapper (stub) may or may not be removed.

In separate-stub-unmodified-original-different-computing-environment instrumentation, the instrumentation procedure generates a stub which replaces the original in its location in the current computing environment, and the original is moved to a remote computing environment for execution. Upon execution of the instrumented original, the stub is executed, and the stub forwards the requests to the remote original for execution.

In separate-stub-modified-original-different-computing-environment instrumentation, the instrumentation procedure generates a stub which replaces the original in the location of the original in the current computing environment. The modified original is moved to a remote computing environment for execution. This is the model that some implementations of remote procedure call (RPC) use. The instrumentation procedure divides an application into the function interface and the function implementation. The function interface does nothing more than forwarding the requests to the function implementation residing in a remote computing environment. The instrumentation procedure generates a stub with the function interface that forwards requests through the RPC protocol, and a remote procedure call library (the modified original) which listens for requests to execute the function on a remote computing environment.

Figure 8:
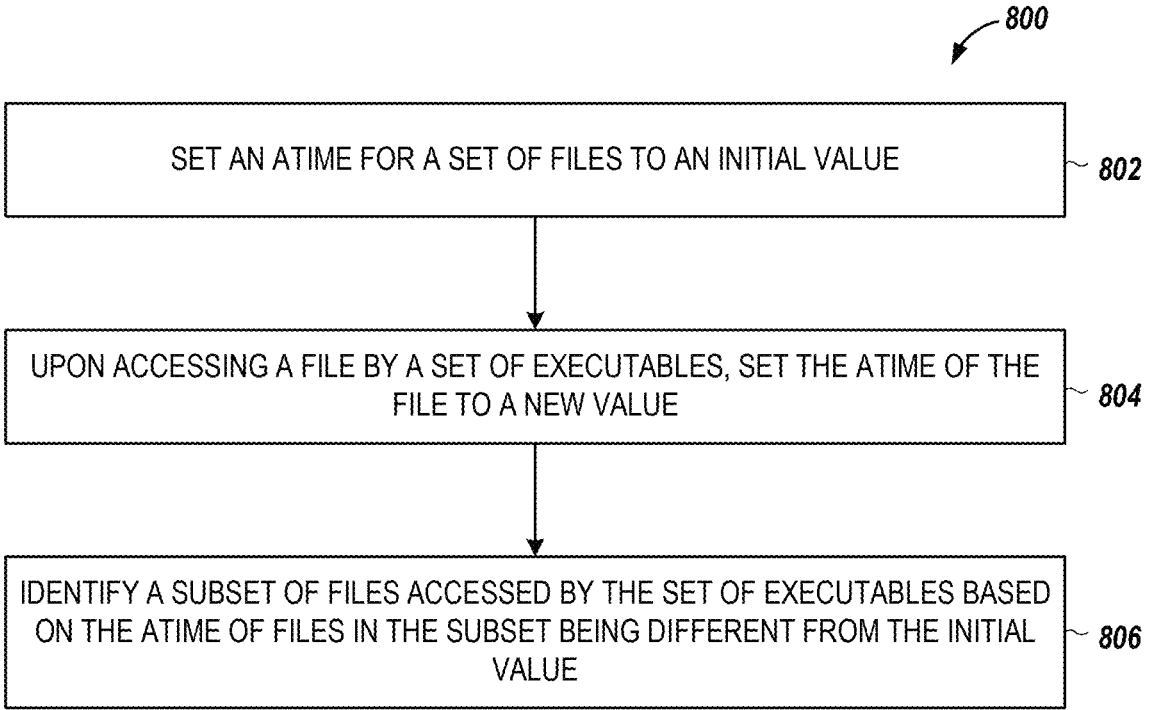
FIG. 8 is a flow chart of an example technique for instrumentation using access time value, in accordance with some embodiments.

FIG. 8 is a flow chart of an example technique 800 for instrumentation using access time value, in accordance with some embodiments. The technique 800 may be performed in a computing environment (e.g., one or more of the computing environments 200, 300, 400, 500, and/or 600), which may be implemented using one or more computing machines (e.g., the computing machine 100), for example, using one or more virtual machines executing on top of the one or more computing machines.

At block 802, the computing environment sets an atime for a set of files to an initial value. The atime is a field in metadata of a file and represents a time when the file was accessed. The initial value may correspond to a predetermined value (e.g., 1000 or 12:00:00 pm on Jan. 1, 2023) or may correspond to a time before performance of block 804.

At block 804, upon accessing a file by a set of executables of an application image, the computing environment sets the atime of the file to a new value. The new value may correspond to a current time or a predetermined value (e.g., 2000) different from the initial value. This operation may be performed a single time for a single file or multiple times for multiple different files. In some cases, the atime of a single file is updated more than once. The setting of the atime may be done by a kernel (e.g., the kernel 202, 302, 402, 502, and/or 602).

Alternatively, in a network-based implementation, the accessing of the files may be done by a first device (e.g., a client device) and the setting of the atime may be done by a second device (e.g., a server). This may occur, for example, if the accessing of the files is done by the client device that is accessing files in a database (or another type of data storage unit) via the server.

In some implementations, the initial value is zero and the new value is a value that is different from zero (e.g., a current time when the file is accessed, as measured by a clock of the computing environment). Zero may correspond to the Unix epoch time value-midnight on Jan. 1, 1970 Greenwich Mean Time (GMT). In alternative implementations, the atime may be set to a specified time that is before the current time (e.g., a few seconds after the Unix epoch time value, a few years after the Unix epoch time value, or 09:00:00 AM on Jan. 1, 2020). However, due to interactions of the computing environment, as disclosed herein, with the native computing environment of a computing machine, in some cases, setting the initial value to something different from zero or different from the Unix epoch time value might not work.

In some implementations, the atime is set to the new value whenever the file is accessed by the set of executables. In other implementations, the computing environment sets the atime to the new value in response to determining, by the computing environment, that at least one of: the initial access of the file is occurring, the current modification time is younger than the atime before setting the atime to the new value, the current change time is younger than the atime before setting the atime to the new value, or the atime before setting the atime to the new value is at least the threshold time period before a current time.

An application image may include the set of executables. For example, in FIG. 2, the application image 212 includes the executables 214A and 214B. The set of executables may include a single executable or multiple executables.

In some examples, the initial value represents a time before a start time of executing the application image including the set of executables (or the set of executables themselves). The start time occurs after setting the atime for the set of files to the initial value. The new value represents a time after the start time.

In some cases, block 804 is performed for at least one file accessed by the set of executables. In some cases, block 804 is performed for a subset of the files accessed by the set of executables. In some cases, block 804 is performed for each and every file accessed by the set of executables.

In some cases, block 804 is performed for a given file every time the given file is accessed. In some cases, block 804 is performed for at least one file at least once (and not performed for other times at other accesses of those other files).

It should be noted that, in block 804, setting the atime occurs upon accessing the file, but not necessarily in response to accessing the file. In some implementations an additional stimulus causes both accessing the file and setting the atime.

At block 806, the computing environment identifies a subset of files accessed by the set of executables based on the atime of files in the subset being different from the initial value. The computing environment provides an output representing the subset of files. The output may be stored at the computing environment, displayed via a display unit of the computing environment, or transmitted to another computing environment for display or storage at the other computing environment.

As described above, some implementations reset the atime, start the instrumentation run, and then identify the accessed files at the end of the instrumentation run. In some cases, the instrumentation run may be implemented over a long period of time (e.g., multiple hours, days, months, or years). In some cases, a user may run an instrumented image in lieu of the original, even for normal operation. Thus, there might not be "instrumentation sessions." All sessions may include normal operation with instrumentation taking place in the background. The instrumentation results may be obtained after multiple hours, days, months, or years of normal use.

Some implementations include a "side monitoring" feature. Code executing in an instrumented application at the beginning of the instrumentation session (or regular usage with instrumentation taking place in the background) sets the atime of the set of files to the initial value, and performs additional functions. After the atime values are set and before the instrumented application begins the execution of the original, the code starts a side process which runs throughout the entire session. This side process wakes up at some predetermined times (e.g., every hour) and performs the identifying accessed file operation (the block 806) which might, in alternative implementations as described above, be performed only at the end of the instrumentation session. As a result, the user may access the interim report of the list of accessed files in real-time without waiting for the instrumentation to finish.

According to some implementations, an instrumented application includes the set of executables. The instrumented application includes a stub of an original application, as well as the original applications. Setting the atime for the set of files to the initial value is accomplished by software that intercepts the instrumented application at a beginning of execution of a first executable from the set of executables. Identifying the subset of files is accomplished by software that intercepts the instrumented application at an end of execution of a second executable from the set of executables.

In some implementations, the computing environment identifies a content item in temporary instantiated storage for the instrumented application. The computing environment causes, via an unstubbing technique, the content item to appear in an original location of the content item in the original application after setting the atime for the set of files to the initial value.

In some implementations, the set of executables includes an instrumentation (including the stub and the original) of at least one executable from an application image. The stub of the instrumentation sets the atime for the set of files to the initial value. The stub of the instrumentation identifies the subset of files.

In some implementations, the computing environment overrides, using a computing environment manager, a default entry point of an application image that includes the set of executables to access a wrapper engine (e.g., the wrapper engine 520 or the beginning wrapper 616A and the ending wrapper 616B). The wrapper engine sets the atime for the set of files to the initial value. The wrapper engine identifies the subset of files. In some cases, the wrapper engine exists externally to the application image. Alternatively, the wrapper engine may be added to the application image.

In some implementations, the computing environment adds, to the application image comprising the set of executables, a first wrapper engine (e.g., the beginning wrapper 616A) for execution upon initiation of the application image. The first wrapper engine sets the atime for the set of files to the initial value. The computing environment adds, to the application image comprising the set of executables, a second wrapper engine (e.g., the ending wrapper 616B) for execution upon termination of the application image. The second wrapper engine identifies the subset of files. In some cases, a single wrapper engine includes (e.g., provides the functionality of and/or includes software code for) the first wrapper engine and the second wrapper engine. Alternatively, the first wrapper engine and the second wrapper engine may be different engines.

As described herein, in some cases the atime is set (e.g., at block 804) by a kernel. Alternatively, other software, hardware or combination(s) of software and hardware may be used to set the atime. Some implementations of the Linux operating system include kernel processes and user processes. The kernel processes handle operating system tasks and run in kernel mode, which is a privileged CPU execution mode with unrestricted access to system resources. User processes typically run in user mode, which is the unprivileged CPU execution mode providing isolation from system resources, kernel, and other user processes. When a user process executes a system call, the CPU may make a context switch into the kernel mode to execute the system call service routines of the kernel.

As used herein, the phrase "by a kernel" may include, among other things, "by a kernel process" or "by any process while it is executing some kernel code in the privileged CPU execution mode."

Setting the atime by the kernel may include a kernel process executing the code to set the atime of the file. Alternatively, setting the atime by the kernel may include setting the atime by a process that executes at least some kernel code in the privileged CPU execution mode. When the CPU is running a user process, the CPU switches back and forth between the unprivileged user execution mode and the privileged kernel execution mode. Setting the atime of the file may be accomplished using multiple instructions in the code, at least some of which are executed in the privileged kernel execution mode. In some cases, the instructions for setting the atime of the file are executed entirely in the CPU's privileged kernel execution mode. In some cases, the instructions for initiating setting the atime of the file are executed in the CPU's privileged kernel execution mode.

In one example use case, an application image file, appimg (the original image file) packages two application programs. Each application program includes one executable and one data file in a single file.

TABLE 3

Image file: appimg
(Default entry point: /bin/prog1)

| File path | File content |
|---|---|
| /bin/prog1 | The executable for program 1 |
| /bin/prog2 | The executable for program 2 |
| /etc/prog1.config | The configuration file for program 1 |
| /etc/prog2.config | The configuration file for program 2 |

When appimg is launched using a computing environment manager, a temporary storage instance is created and the four files listed in Table 3 are made to appear in the temporary storage. Then, /bin/prog1 is executed. The temporary storage appears as shown in Table 4 at this point.

TABLE 4

Temporary storage instance running an appimg
instance, at the entry to main program

| File path | File content |
|---|---|
| /bin/prog1 | The executable for program 1 |
| /bin/prog2 | The executable for program 2 |
| /etc/prog1.config | The configuration file for program 1 |
| /etc/prog2.config | The configuration file for program 2 |

The application image file, appimg, is then instrumented. The instrumentation procedure produces a new image file—the instrumentation of appimg, which includes both the stub and the original.

TABLE 5

Image file: appimg-instrumentation
(Default entry point: /bin/prog1)

| File path | File content |
|---|---|
| /bin/prog1 | The stub of the executable for program 1 |
| /bin/prog2 | The stub of the executable for program 2 |
| /etc/prog1.config | The configuration file for program 1 |
| /etc/prog2.config | The configuration file for program 2 |
| /relocatedir/123456/orig-prog1 | The executable for program 1 |
| /relocatedir/123456/orig-prog1-stubcfg | Stub-related data for program 1 |
| /relocatedir/abcdef/orig-prog2 | The executable for program 2 |
| /relocatedir/abcdef/orig-prog2-stubcfg | Stub-related data for program 2 |

The instrumentation procedure replaces each executable with its stub and moves the original executable to a relocate directory. The resultant image file contains the eight files listed in Table 5. (In some cases, the instrumentation procedure may produce more files. Table 5 is a simplified example.)

When the instrumented image file (appimg-instrumentation) is launched using a computing environment manager, a temporary storage is created and the eight files listed in Table 5 are made to appear in the temporary storage. Then, /bin/prog1 is executed, with/bin/prog1 being the stub of the main program. The instrumentation mechanism is then set up by/bin/prog1. In atime instrumentation, as disclosed herein, the computer goes over the temporary storage instance to set the atime of all files to an initial value. After all initialization is done, the stub executes/relocatedir/123456/orig-prog1, the original program 1.

TABLE 6

Temporary storage instance running an appimg-
instrumentation instance, after initialization

| File path | File content |
|---|---|
| /bin/prog1 | The stub of the executable for program 1 |
| /bin/prog2 | The stub of the executable for program 2 |
| /etc/prog1.config | The configuration file for program 1 |
| /etc/prog2.config | The configuration file for program 2 |
| /relocatedir/123456/orig-prog1 | The executable for program 1 |
| /relocatedir/123456/orig-prog1-stubcfg | Stub-related data for program 1 |
| /relocatedir/abcdef/orig-prog2 | The executable for program 2 |
| /relocatedir/abcdef/orig-prog2-stubcfg | Stub-related data for program 2 |

When a program is executed in the computing environment running the instrumented image, the stub, which is found in the original location (/bin/prog1, /bin/prog2) is executed. The stub performs instrumentation-related tasks (if necessary), then executes the original program, which is now placed in the relocate directory.

The path translation may include the translation between a program's original path (/bin/prog1) and its relocate path (/relocatedir/123456/orig-prog1). When running an instrumented image, this translation is needed to cause the original program (launched by its stub from the relocate directory) to act as though the original program is still in the original location (rather than in the relocate directory).

Some implementations perform unstubbing at the stub of the main program. Table 7 shows what the temporary storage instance looks like after the unstubbing procedure is done. As shown, the executables of all programs are moved (or copied) back to where they should be. Now, executing/bin/prog1, /bin/prog2 causes running of the original programs rather than the stubs, just as in a computing environment instantiated using the original appimg image file. And because the original programs are started using the correct original paths, path translation might not be needed.

TABLE 7

Temporary storage instance running an appimg-
instrumentation instance, after unstubbing

| File path | File content |
|---|---|
| /bin/prog1 | The executable for program 1 |
| /bin/prog2 | The executable for program 2 |
| /etc/prog1.config | The configuration file for program 1 |
| /etc/prog2.config | The configuration file for program 2 |
| /relocatedir/123456/orig-prog1-stubcfg | Stub-related data for program 1 |
| /relocatedir/abcdef/orig-prog2-stubcfg | Stub-related data for program 2 |

As shown in Table 7, after unstubbing, the temporary storage instance might not be completely restored to the state of the original appimg. As shown, only the executables are moved back.

As described herein, the image file appimg is a non-limiting example of an application image or an application image file. The executables for program 1 and program 2—/bin/prog1 and/bin/prog2—are non-limiting examples of a set of executables. As described herein, appimg-instrumentation is a non-limiting example of an instrumented application image, which includes a stub and the original application image. The original program 1 and 2, i.e., /relocatedir/123456/orig-prog1 and/relocatedir/abcdef/orig-prog2, are non-limiting examples of one or more executables. These reside in the temporary storage instance running the appimg-instrumentation instance prior to uns-tubbing. The file paths/bin/prog1 and/bin/prog2 correspond to a storage location in the original application image to which data from the instrumented application image may be copied during unstubbing.

Some embodiments are described as numbered examples (Example 1, 2, 3, etc.). These are provided as examples only and do not limit the technology disclosed herein.

Example 1 is a computer-implemented method for iden-tifying accessed files, the method comprising: setting an access time for a set of files to an initial value; upon accessing a file by a set of executables, setting the access time of the file to a new value; identifying, from the set of files, a subset of files accessed by the set of executables based on the access time of files in the subset being different from the initial value; and providing an output representing the subset of files.

In Example 2, the subject matter of Example 1 includes, wherein the access time is a field in metadata of the file, wherein the initial value is zero, and wherein the new value represents a time when the file is accessed.

In Example 3, the subject matter of any one of Examples 1-2 includes, wherein an instrumented application comprises the set of executables, wherein the instrumented application comprises an original application and a stub of the original application, wherein setting the access time for the set of files to the initial value is accomplished by software that intercepts the instrumented application at a beginning of execution of a first executable from the set of executables, and wherein identifying the subset of files is accomplished by software that intercepts the instrumented application at an end of execution of a second executable from the set of executables.

In Example 4, the subject matter of Example 3 includes, wherein the instrumented application comprises an output of instrumentation of the original application.

In Example 5, the subject matter of any one of Examples 3-4 includes, identifying a content item in temporary instan-tiated storage for the instrumented application; and causing the content item to appear in an original location of the content item in the original application after setting the access time for the set of files to the initial value. Causing the content item to appear in the original location may be performed by an unstubbing technique.

In Example 6, the subject matter of any one of Examples 1-5 includes, wherein the set of executables comprises a stub of at least one executable from an application image. The stub may set the access time for the set of files to the initial value. The stub may identify the subset of files. The stub may be generated during instrumentation of the at least one executable.

In Example 7, the subject matter of Example 6 includes, wherein the set of executables comprises an instrumentation of at least one executable, the instrumentation comprising the stub and an original of the at least one executable.

In Example 8, the subject matter of any one of Examples 1-7 includes, overriding, using a computing environment manager, a default entry point of an application image comprising the set of executables to access a wrapper engine. The wrapper engine may set the access time for the set of files to the initial value.

In Example 9, the subject matter of Example 8 includes, wherein the wrapper engine identifies the subset of files.

In Example 10, the subject matter of any one of Examples 8-9 includes, adding the wrapper engine to the application image.

In Example 11, the subject matter of any one of Examples 8-10 includes, wherein the wrapper engine is external to the application image but is mapped to a computing environ-ment by specifying a start setting to a computing environ-ment manager that manages the computing environment, wherein the computing environment comprises at least one executable from the application image.

In Example 12, the subject matter of any one of Examples 8-11 includes, wherein the wrapper engine is external to the application image and is not mapped to a computing envi-ronment, wherein the computing environment comprises at least one executable from the application image.

In Example 13, the subject matter of any one of Examples 1-12 includes, adding, to an application image comprising the set of executables, a first wrapper engine for execution upon initiation of the application image, wherein the first wrapper engine sets the access time for the set of files to the initial value.

In Example 14, the subject matter of Example 13 includes, adding, to the application image comprising the set of executables, a second wrapper engine for execution upon termination of the application image, wherein the second wrapper engine identifies the subset of files.

In Example 15, the subject matter of Example 14 includes, wherein a single wrapper engine comprises the first wrapper engine and the second wrapper engine.

In Example 16, the subject matter of any one of Examples 1-15 includes, wherein the set of executables comprises a single executable.

In Example 17, the subject matter of any one of Examples 1-16 includes, wherein an application image comprises the set of executables.

In Example 18, the subject matter of any one of Examples 1-17 includes, wherein the initial value represents a time before a start time of executing the set of executables, the start time occurring after setting the access time for the set of files to the initial value.

In Example 19, the subject matter of Example 18 includes, wherein the new value represents a time after the start time.

In Example 20, the subject matter of any one of Examples 1-19 includes, wherein setting the access time to the new value is in response to determining that at least one of: an initial access of the file is occurring, a current modification time is younger than the access time before setting the access time to the new value, a current change time is younger than the access time before setting the access time to the new value, or the access time before setting the access time to the new value is at least a threshold time period before a current time.

In Example 21, the subject matter of any one of Examples 1-20 includes, executing a side process to wake up in response to a trigger, wherein the subset of files accessed by the set of executables is identified, during execution of the application image, upon waking up of the side process.

In Example 22, the subject matter of Example 21 includes, wherein the trigger comprises at least one of: reaching one or more predetermined times, a user request, a signal, an inter-process communication message or a net-work message.

Example 23 is a non-transitory machine-readable medium storing instructions which, when executed by one or more computing machines, cause the one or more computing machines to perform operations comprising: setting an access time for a set of files to an initial value; upon accessing a file by a set of executables, setting the access time of the file to a new value; identifying, from the set of files, a subset of files accessed by the set of executables based on the access time of files in the subset being different from the initial value; and providing an output representing the subset of files.

In Example 24, the subject matter of Example 23 includes, wherein the access time is a field in metadata of the file, wherein the initial value is zero, and wherein the new value represents a time when the file is accessed.

In Example 25, the subject matter of any one of Examples 23-24 includes, wherein an instrumented application comprises the set of executables, wherein the instrumented application comprises an original application and a stub of the original application, wherein setting the access time for the set of files to the initial value is accomplished by software that intercepts the instrumented application at a beginning of execution of a first executable from the set of executables, and wherein identifying the subset of files is accomplished by software that intercepts the instrumented application at an end of execution of a second executable from the set of executables.

In Example 26, the subject matter of Example 25 includes, wherein the instrumented application comprises an output of instrumentation of the original application.

In Example 27, the subject matter of any one of Examples 25-26 includes, the operations further comprising: identifying a content item in temporary instantiated storage for the instrumented application; and causing the content item to appear in an original location of the content item in the original application after setting the access time for the set of files to the initial value. Causing the content item to appear in the original location may be performed by an unstubbing technique.

In Example 28, the subject matter of any one of Examples 23-27 includes, wherein the set of executables comprises a stub of at least one executable from an application image, wherein the stub sets the access time for the set of files to the initial value. The stub may identify the subset of files. The stub may be generated during instrumentation of the at least one executable.

In Example 29, the subject matter of Example 28 includes, wherein the set of executables comprises an instrumentation of at least one executable, the instrumentation comprising the stub and an original of the at least one executable.

In Example 30, the subject matter of any one of Examples 23-29 includes, the operations further comprising: overriding, using a computing environment manager, a default entry point of an application image comprising the set of executables to access a wrapper engine. The wrapper engine may set the access time for the set of files to the initial value.

In Example 31, the subject matter of Example 30 includes, wherein the wrapper engine identifies the subset of files.

In Example 32, the subject matter of any one of Examples 30-31 includes, the operations further comprising: adding the wrapper engine to the application image.

In Example 33, the subject matter of any one of Examples 30-32 includes, wherein the wrapper engine is external to the application image but is mapped to a computing environment by specifying a start setting to a computing environment manager that manages the computing environment, wherein the computing environment comprises at least one executable from the application image.

In Example 34, the subject matter of any one of Examples 30-33 includes, wherein the wrapper engine is external to the application image and is not mapped to a computing environment, wherein the computing environment comprises at least one executable from the application image.

In Example 35, the subject matter of any one of Examples 23-34 includes, the operations further comprising: adding, to an application image comprising the set of executables, a first wrapper engine for execution upon initiation of the application image. The first wrapper engine may set the access time for the set of files to the initial value.

In Example 36, the subject matter of Example 35 includes, the operations further comprising: adding, to the application image comprising the set of executables, a second wrapper engine for execution upon termination of the application image, wherein the second wrapper engine identifies the subset of files.

In Example 37, the subject matter of Example 36 includes, wherein a single wrapper engine comprises the first wrapper engine and the second wrapper engine.

In Example 38, the subject matter of any one of Examples 23-37 includes, wherein the set of executables comprises a single executable.

In Example 39, the subject matter of any one of Examples 23-38 includes, wherein an application image comprises the set of executables.

In Example 40, the subject matter of any one of Examples 23-39 includes, wherein the initial value represents a time before a start time of executing the set of executables, the start time occurring after setting the access time for the set of files to the initial value.

In Example 41, the subject matter of Example 40 includes, wherein the new value represents a time after the start time.

In Example 42, the subject matter of any one of Examples 23-41 includes, wherein setting the access time to the new value is in response to determining that at least one of: an initial access of the file is occurring, a current modification time is younger than the access time before setting the access time to the new value, a current change time is younger than the access time before setting the access time to the new value, or the access time before setting the access time to the new value is at least a threshold time period before a current time.

In Example 43, the subject matter of any one of Examples 23-42 includes, the operations further comprising: executing a side process to wake up in response to a trigger, wherein the subset of files accessed by the set of executables is identified, during execution of the application image, upon waking up of the side process.

In Example 44, the subject matter of Example 43 includes, wherein the trigger comprises at least one of: reaching one or more predetermined times, a user request, a signal, an inter-process communication message or a network message.

Example 45 is an apparatus comprising: processing circuitry; and a memory storing instructions which, when executed by the processing circuitry, cause the processing circuitry to perform operations comprising: setting an access time for a set of files to an initial value; upon accessing a file by a set of executables, setting the access time of the file to a new value; identifying, from the set of files, a subset of files accessed by the set of executables based on the access time of files in the subset being different from the initial value; and providing an output representing the subset of files.

In Example 46, the subject matter of Example 45 includes, wherein the access time is a field in metadata of the file, wherein the initial value is zero, and wherein the new value represents a time when the file is accessed.

In Example 47, the subject matter of any one of Examples 45-46 includes, wherein an instrumented application comprises the set of executables, wherein the instrumented application comprises an original application and a stub of the original application, wherein setting the access time for the set of files to the initial value is accomplished by software that intercepts the instrumented application at a beginning of execution of a first executable from the set of executables, and wherein identifying the subset of files is accomplished by software that intercepts the instrumented application at an end of execution of a second executable from the set of executables.

In Example 48, the subject matter of Example 47 includes, wherein the instrumented application comprises an output of instrumentation of the original application.

In Example 49, the subject matter of any one of Example 47-48 includes, the operations further comprising: identifying a content item in temporary instantiated storage for the instrumented application; and causing the content item to appear in an original location of the content item in the original application after setting the access time for the set of files to the initial value. Causing the content item to appear in the original location may be performed by an unstubbing technique.

In Example 50, the subject matter of Examples any one of 45-49 includes, wherein the set of executables comprises a stub of at least one executable from an application image. The stub may set the access time for the set of files to the initial value. The stub may identify the subset of files. The stub may be generated during instrumentation of the at least one executable.

In Example 51, the subject matter of Example 50 includes, wherein the set of executables comprises an instrumentation of at least one executable, the instrumentation comprising the stub and an original of the at least one executable.

In Example 52, the subject matter of any one of Examples 45-51 includes, the operations further comprising: overriding, using a computing environment manager, a default entry point of an application image comprising the set of executables to access a wrapper engine. The wrapper engine may set the access time for the set of files to the initial value.

In Example 53, the subject matter of Example 52 includes, wherein the wrapper engine identifies the subset of files.

In Example 54, the subject matter of any one of Examples 52-53 includes, the operations further comprising: adding the wrapper engine to the application image.

In Example 55, the subject matter of any one of Examples 52-54 includes, wherein the wrapper engine is external to the application image but is mapped to a computing environment by specifying a start setting to a computing environment manager that manages the computing environment, wherein the computing environment comprises at least one executable from the application image.

In Example 56, the subject matter of any one of Examples 52-55 includes, wherein the wrapper engine is external to the application image and is not mapped to a computing environment, wherein the computing environment comprises at least one executable from the application image.

In Example 57, the subject matter of any one of Examples 45-56 includes, the operations further comprising: adding, to an application image comprising the set of executables, a first wrapper engine for execution upon initiation of the application image, wherein the first wrapper engine sets the access time for the set of files to the initial value.

In Example 58, the subject matter of Example 57 includes, the operations further comprising: adding, to the application image comprising the set of executables, a second wrapper engine for execution upon termination of the application image, wherein the second wrapper engine identifies the subset of files.

In Example 59, the subject matter of Example 58 includes, wherein a single wrapper engine comprises the first wrapper engine and the second wrapper engine.

In Example 60, the subject matter of any one of Examples 45-59 includes, wherein the set of executables comprises a single executable.

In Example 61, the subject matter of any one of Examples 45-60 includes, wherein an application image comprises the set of executables.

In Example 62, the subject matter of any one of Examples 45-61 includes, wherein the initial value represents a time before a start time of executing the set of executables, the start time occurring after setting the access time for the set of files to the initial value.

In Example 63, the subject matter of Example 62 includes, wherein the new value represents a time after the start time.

In Example 64, the subject matter of any one of Examples 45-63 includes, wherein setting the access time to the new value is in response to determining that at least one of: an initial access of the file is occurring, a current modification time is younger than the access time before setting the access time to the new value, a current change time is younger than the access time before setting the access time to the new value, or the access time before setting the access time to the new value is at least a threshold time period before a current time.

In Example 65, the subject matter of any one of Examples 45-64 includes, the operations further comprising: executing a side process to wake up in response to a trigger, wherein the subset of files accessed by the set of executables is identified, during execution of the application image, upon waking up of the side process.

In Example 66, the subject matter of Example 65 includes, wherein the trigger comprises at least one of: reaching one or more predetermined times, a user request, a signal, an inter-process communication message or a network message.

Example 67 is at least one machine-readable medium including instructions that, when executed by processing circuitry, cause the processing circuitry to perform operations to implement of any one of Examples 1-66.

Example 68 is an apparatus comprising means to implement of any one of Examples 1-66.

Example 69 is a system comprising processing circuitry and memory, the processing circuitry to implement of any one of Examples 1-66.

Example 70 is a method to implement of any one of Examples 1-66.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72 (b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method for identifying accessed files in a computing environment by instrumenting one or more applications, the method comprising:
setting, by an initialization operation of an instrumentation engine at a beginning of an instrumentation session for an instrumented application comprising a set of executables, an access time for a set of files to an initial value, wherein the initial value corresponds to a predetermined time prior to a start time of executing the set of executables;
adding, to an application image comprising the set of executables, a first wrapper engine for execution upon initiation of the application image, wherein the first wrapper engine sets the access time for the set of files to the initial value;
executing at least a part of the set of executables in the instrumented application, wherein upon accessing a file by the set of executables a kernel of the computing environment sets the access time of the file to a new value;
identifying, from the set of files by a data collection operation of the instrumentation engine at an end of the instrumentation session, a subset of files accessed by the set of executables based on the access time of the files in the subset being different from the initial value; and
providing an output representing the subset of files, wherein the output enables at least one of detecting unusual behavior of the one or more applications or restricting access to one or more files not included in the subset of files.

2. The method of claim 1, further comprising:
overriding, using a computing environment manager, a default entry point of the application image, wherein the application image comprises the set of executables, to access a wrapper engine, wherein the wrapper engine sets the access time for the set of files to the initial value.

3. The method of claim 1, wherein the access time is a field in metadata of the file, wherein the initial value is zero, and wherein the new value represents a time when the file is accessed.

4. The method of claim 1, further comprising:
executing a side process to wake up in response to a trigger, wherein the subset of files accessed by the set of executables is identified, during execution of the application image, upon waking up of the side process.

5. A non-transitory machine-readable medium storing instructions which, when executed by one or more computing machines, cause the one or more computing machines to perform operations comprising:
setting, by an initialization operation of an instrumentation engine at a beginning of an instrumentation session for an instrumented application comprising a set of executables, an access time for a set of files to an initial value, wherein the initial value corresponds to a predetermined time prior to a start time of executing the set of executables;
executing at least a part of the set of executables in the instrumented application, wherein upon accessing a file by the set of executables a kernel of a computing environment sets the access time of the file to a new value;
identifying, from the set of files by a data collection operation of the instrumentation engine at an end of the instrumentation session, a subset of files accessed by the set of executables based on the access time of the files in the subset being different from the initial value; and
providing an output representing the subset of files, wherein the output enables at least one of detecting unusual behavior of one or more applications or restricting access to one or more files not included in the subset of files, wherein the set of executables comprises a stub of at least one executable from an application image, wherein the stub sets the access time for the set of files to the initial value, and wherein the stub identifies the subset of files, wherein the stub is generated during instrumentation of the at least one executable.

6. The machine-readable medium of claim 5, wherein the access time is a field in metadata of the file, wherein the initial value is zero, and wherein the new value represents a time when the file is accessed.

7. The machine-readable medium of claim 5, wherein the instrumented application comprises an original application and a stub of the original application, wherein setting the access time for the set of files to the initial value is accomplished by software that intercepts the instrumented application at a beginning of execution of a first executable from the set of executables, and wherein identifying the subset of files is accomplished by software that intercepts the instrumented application at an end of execution of a second executable from the set of executables.

8. The machine-readable medium of claim 7, wherein the instrumented application comprises an output of instrumentation of the original application.

9. The machine-readable medium of claim 7, the operations further comprising:
identifying a content item in temporary instantiated storage for the instrumented application; and
causing, via an unstubbing technique, the content item to appear in an original location of the content item in the original application after setting the access time for the set of files to the initial value.

10. The machine-readable medium of claim 5, wherein the set of executables comprises an instrumentation of the at least one executable, wherein the instrumentation comprises the stub and an original of the at least one executable.

11. The machine-readable medium of claim 5, the operations further comprising:
overriding, using a computing environment manager, a default entry point of the application image, wherein the application image comprises the set of executables, to access a wrapper engine, wherein the wrapper engine sets the access time for the set of files to the initial value.

12. The machine-readable medium of claim 11, wherein the wrapper engine identifies the subset of files.

13. The machine-readable medium of claim 11, the operations further comprising:
adding the wrapper engine to the application image.

14. The machine-readable medium of claim 11, wherein the wrapper engine is external to the application image but is mapped to the computing environment by specifying a start setting to the computing environment manager that manages the computing environment, wherein the computing environment comprises one or more executables from the application image.

15. The machine-readable medium of claim 11, wherein the wrapper engine is external to the application image and is not mapped to the computing environment, wherein the computing environment comprises one or more executables from the application image.

16. The machine-readable medium of claim 5, the operations further comprising:
adding, to the application image, a first wrapper engine for execution upon initiation of the application image, wherein the first wrapper engine sets the access time for the set of files to the initial value, and wherein the application image comprises the set of executables.

17. The machine-readable medium of claim 16, the operations further comprising:

34 adding, to the application image comprising the set of executables, a second wrapper engine for execution upon termination of the application image, wherein the second wrapper engine identifies the subset of files.

18. The machine-readable medium of claim 17, wherein a single wrapper engine comprises the first wrapper engine and the second wrapper engine.

19. The machine-readable medium of claim 5, wherein the set of executables comprises a single executable.

20. The machine-readable medium of claim 5, wherein the application image comprises the set of executables.

21. The machine-readable medium of claim 5, wherein the initial value represents a time before the start time of executing the at least the part of the set of executables, the start time occurring after setting the access time for the set of files to the initial value.

22. The machine-readable medium of claim 21, wherein the new value represents a time after the start time.

23. The machine-readable medium of claim 5, wherein setting the access time to the new value is in response to determining that at least one of: an initial access of the file is occurring, a current modification time is younger than the access time before setting the access time to the new value, a current change time is younger than the access time before setting the access time to the new value, or the access time before setting the access time to the new value is at least a threshold time period before a current time.

24. The machine-readable medium of claim 5, the operations further comprising:
executing a side process to wake up in response to a trigger, wherein the subset of files accessed by the set of executables is identified, during execution of the application image, upon waking up of the side process.

25. The machine-readable medium of claim 24, wherein the trigger comprises at least one of: reaching one or more predetermined times, a user request, a signal, an interprocess communication message or a network message.

26. The machine-readable medium of claim 5, wherein metadata of each file of the set of files comprises an access time field, and wherein setting the access time of the set of files to the initial value comprises setting the access time field of each file of the set of files to the initial value.

27. A system comprising:
processing circuitry; and
a memory storing instructions which, when executed by the processing circuitry, cause the processing circuitry to perform operations comprising:
setting, by an initialization operation of an instrumentation engine at a beginning of an instrumentation session for an instrumented application comprising a set of executables, an access time for a set of files to an initial value, wherein the initial value corresponds to a predetermined time prior to a start time of executing the set of executables;
executing at least a part of the set of executables in the instrumented application, wherein upon accessing a file by the set of executables a kernel of a computing environment sets the access time of the file to a new value;
identifying, from the set of files by a data collection operation of the instrumentation engine at an end of the instrumentation session, a subset of files accessed by the set of executables based on the access time of the files in the subset being different from the initial value; and
providing an output representing the subset of files, wherein the output enables at least one of detecting unusual behavior of one or more applications or restricting access to one or more files not included in the subset of files, wherein the set of executables comprises a stub of at least one executable from an application image, wherein the stub sets the access time for the set of files to the initial value, and wherein the stub identifies the subset of files, wherein the stub is generated during instrumentation of the at least one executable.

28. The system of claim 27, wherein the access time is a field in metadata of the file, wherein the initial value is zero, and wherein the new value represents a time when the file is accessed.

29. The system of claim 27, wherein the instrumented application comprises an original application and a stub of the original application, wherein setting the access time for the set of files to the initial value is accomplished by software that intercepts the instrumented application at a beginning of execution of a first executable from the set of executables, and wherein identifying the subset of files is accomplished by software that intercepts the instrumented application at an end of execution of a second executable from the set of executables.

30. The system of claim 27, wherein the set of executables comprises an instrumentation of the at least one executable, wherein the instrumentation comprises the stub and an original of the at least one executable.

* * * * *